United States Patent
Shibata et al.

(10) Patent No.: US 8,132,450 B2
(45) Date of Patent: Mar. 13, 2012

(54) MALFUNCTION DIAGNOSIS DEVICE FOR EXHAUST GAS PURIFICATION SYSTEM AND MALFUNCTION DIAGNOSIS METHOD THEREFOR

(75) Inventors: Daisuke Shibata, Numazu (JP); Hiroshi Sawada, Gotenba (JP); Taiga Hagimoto, Susono (JP); Kazuhiro Wakao, Susono (JP); Keisuke Sano, Susono (JP); Kimikazu Yoda, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/670,927

(22) PCT Filed: Apr. 14, 2009

(86) PCT No.: PCT/IB2009/005236
§ 371 (c)(1),
(2), (4) Date: Jan. 27, 2010

(87) PCT Pub. No.: WO2009/127941
PCT Pub. Date: Oct. 22, 2009

(65) Prior Publication Data
US 2010/0199754 A1  Aug. 12, 2010

(30) Foreign Application Priority Data
Apr. 14, 2008  (JP) ................ 2008-104876

(51) Int. Cl.
*G01M 15/10*   (2006.01)
(52) U.S. Cl. .................. 73/114.75; 73/114.71

(58) Field of Classification Search ............... 73/114.71, 73/114.75
See application file for complete search history.

(56) References Cited

U.S. PATENT DOCUMENTS

| | | | | |
|---|---|---|---|---|
| 6,026,640 | A * | 2/2000 | Kato et al. | 60/274 |
| 6,167,695 | B1 * | 1/2001 | Itou et al. | 60/274 |
| 6,701,707 | B1 * | 3/2004 | Upadhyay et al. | 60/277 |
| 6,981,368 | B2 * | 1/2006 | van Nieuwstadt et al. | 60/277 |
| 6,990,854 | B2 * | 1/2006 | van Nieuwstadt et al. | 73/114.75 |
| 7,021,044 | B2 * | 4/2006 | Mukaihara et al. | 60/277 |
| 7,114,326 | B2 * | 10/2006 | Mukaihira et al. | 60/277 |
| 7,444,233 | B2 * | 10/2008 | Takatsuto et al. | 701/114 |
| 7,610,750 | B2 * | 11/2009 | Viola et al. | 60/286 |

(Continued)

FOREIGN PATENT DOCUMENTS
JP   A-2002-155736   5/2002
(Continued)

OTHER PUBLICATIONS
International Search Report for International Application No. PCT/IB2009/005236, issued Aug. 27, 2009.
(Continued)

*Primary Examiner* — Freddie Kirkland, III
(74) *Attorney, Agent, or Firm* — Oliff & Berridge, PLC

(57) ABSTRACT

In a malfunction diagnosis device for an exhaust gas purification system including an exhaust gas purification catalyst disposed in the exhaust passage of an internal combustion engine, and a reductant supply device that supplies reductant to exhaust gas that flows in an upstream side of the exhaust gas purification catalyst, the degree of degradation of the exhaust gas purification catalyst is diagnosed by comparing the timing at which the bed temperature of the exhaust gas purification catalyst starts to rise due to the heat of moisture adsorption reaction, against a normal value.

25 Claims, 16 Drawing Sheets

U.S. PATENT DOCUMENTS

2007/0044456 A1   3/2007   Upadhyay et al.

FOREIGN PATENT DOCUMENTS

| JP | A-2003-293743 | 10/2003 |
| --- | --- | --- |
| JP | A-2004-176719 | 6/2004 |
| JP | A-2006-125323 | 5/2006 |
| JP | A-2006-242094 | 9/2006 |

OTHER PUBLICATIONS

Written Opinion of the International Searching Authority for International Application No. PCT/IB2009/005236, issued Aug. 27, 2009.

* cited by examiner

F I G . 14
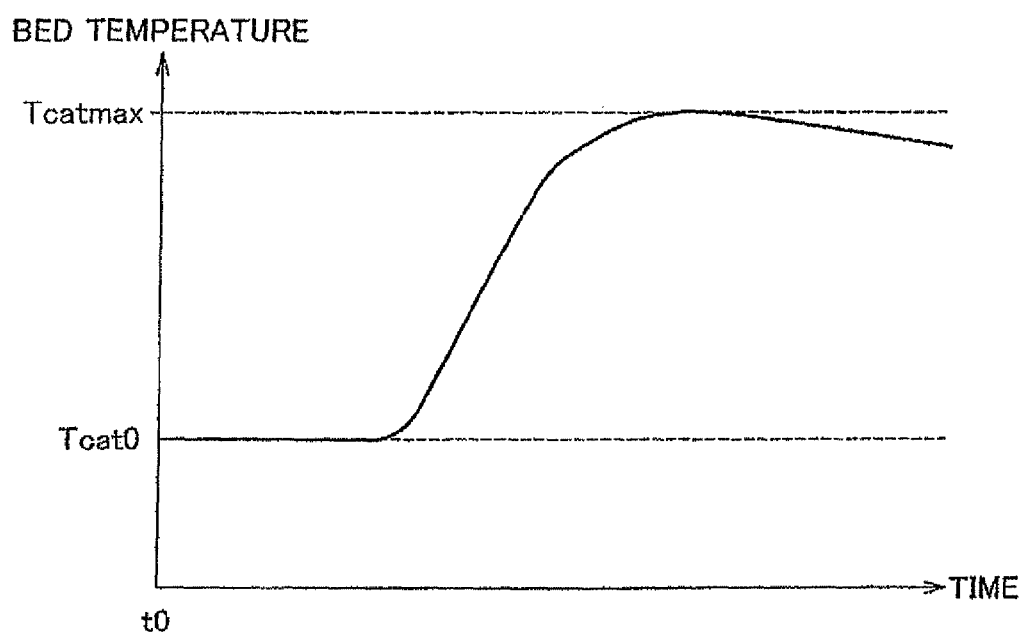

MALFUNCTION DIAGNOSIS DEVICE FOR EXHAUST GAS PURIFICATION SYSTEM AND MALFUNCTION DIAGNOSIS METHOD THEREFOR

BACKGROUND OF THE INVENTION

1. Field of the Invention

The present invention relates to a malfunction diagnosis device for an exhaust gas purification system of an internal combustion engine and a malfunction diagnosis method therefor.

2. Description of the Related Art

In the related art, there has been proposed an exhaust gas purification system in which a selective catalytic reduction catalyst is disposed in the exhaust passage of an internal combustion engine and which includes a urea solution adding device for adding urea solution to exhaust gas that flows upstream of the selective catalytic reduction catalyst.

In the above-mentioned system, ammonia slip (a phenomenon that ammonia ($NH_3$) passes through a selective catalytic reduction catalyst) becomes more pronounced as degradation of the selective catalytic reduction catalyst proceeds. Accordingly, it is necessary to correct the addition quantity of urea solution in accordance with the degree of degradation of the selective catalytic reduction catalyst.

As a method of diagnosing the degradation of a selective catalytic reduction catalyst, there has been proposed a method which integrates the operating time during which the temperature of exhaust gas that flows into the selective catalytic reduction catalyst is equal to or higher than a specified temperature, and diagnoses the degree of degradation of the selective catalytic reduction catalyst to be higher as the integrated time becomes longer (see, for example, Japanese Patent Application Publication No. 2006-242094 (JP-A-2006-242094)).

Incidentally, although the diagnosis method according to the related art mentioned above can be carried out without adding a $NO_x$ sensor, an ammonia concentration sensor, or the like, there is a possibility that accurate diagnosis cannot be performed depending on the usage conditions, the operating conditions of the internal combustion engine, and the like.

While there has been also proposed a method with which diagnosis is done by detecting the quantity (concentration) of nitrogen oxides ($NO_x$) or ammonia ($NH_3$) that flows out of a selective catalytic reduction catalyst at the time when urea is supplied to the selective catalytic reduction catalyst, it is necessary to specify whether the difference between the detected value and a normal value is due to malfunction or degradation of the urea adding device, malfunction or degradation of the sensor, or degradation of the selective catalytic reduction catalyst.

SUMMARY OF THE INVENTION

The present invention improves the diagnostic accuracy of a malfunction diagnosis device and a malfunction diagnosis method for an exhaust gas purification system which includes an exhaust gas purification catalyst.

According to the present invention, the degree of degradation of a selective catalytic reduction (SCR) catalyst is diagnosed based on the quantity of moisture than can be adsorbed by the selective catalytic reduction catalyst.

It was found as a result of diligent experiments and verifications conducted by the inventor of the present invention that the purification capacity of a selective catalytic reduction catalyst correlates with the quantity (saturation quantity) of moisture ($H_2O$) that can be adsorbed by the selective catalytic reduction catalyst. That is, it was found that the purification capacity of a selective catalytic reduction catalyst correlates with the quantity (saturation quantity) of ammonia ($NH_3$) that can be adsorbed by the selective catalytic reduction catalyst, and that the quantity of ammonia ($NH_3$) that can be adsorbed by a selective catalytic reduction catalyst correlates with the quantity of moisture that can be adsorbed by the selective catalytic reduction catalyst. Hereinafter, the quantity of moisture that can be adsorbed by a selective catalytic reduction catalyst will be referred to as maximum moisture quantity, and the quantity of ammonia that can be adsorbed by a selective catalytic reduction catalyst will be referred to as maximum ammonia quantity.

For example, when the purification capacity of a selective catalytic reduction catalyst degrades, the maximum moisture quantity decreases as compared with that in a normal condition (brand-new condition). This tendency becomes more pronounced as the degradation of a selective catalytic reduction catalyst proceeds. That is the maximum moisture quantity decreases as the degradation of a selective catalytic reduction catalyst proceeds.

Therefore, by directly or indirectly acquiring the maximum moisture quantity on a selective catalytic reduction catalyst, it is possible to diagnose the degree of degradation of the selective catalytic reduction catalyst.

An example of maximum moisture quantity acquisition method is to acquire the quantity of heat that is generated at the time when a selective catalytic reduction catalyst adsorbs moisture. A selective catalytic reduction catalyst generates heat upon adsorbing moisture. The quantity of heat generated at that time correlates with the maximum moisture quantity. That is, the smaller the maximum moisture quantity on a selective catalytic reduction catalyst, the smaller the quantity of heat generated by the selective catalytic reduction catalyst upon adsorbing moisture. Therefore, the maximum moisture quantity can be specified by specifying the quantity of heat generated at the time when a selective catalytic reduction catalyst adsorbs moisture.

Incidentally, the above-described degradation diagnosis needs to be carried out when a relatively large quantity of moisture is supplied to a selective catalytic reduction catalyst. Therefore, it is desirable that the above-mentioned degradation diagnosis be carried out at timings when a relatively large quantity of moisture is present within the exhaust passage in an upstream side of the selective catalytic reduction catalyst. An example of timing that satisfies such a condition is the start-up of the internal combustion engine. This is because at the start-up of the internal combustion engine, a relatively large quantity of condensed moisture is present within the exhaust passage.

It should be noted that the present invention may be also applied to a case in which moisture is forcibly supplied to a selective catalytic reduction catalyst. In this case, degradation diagnosis can be performed at times other than the start-up of the internal combustion engine. It is desirable that the quantity of moisture supplied to a selective catalytic reduction catalyst be sufficiently larger than the maximum moisture quantity on a normal selective catalytic reduction catalyst. This is to ensure that accurate degradation diagnosis can be performed even when variations occur in the supplied quantity of moisture.

There is a possibility that the maximum moisture quantity on a selective catalytic reduction catalyst also changes depending on the quantity of ammonia adsorbed on the selective catalytic reduction catalyst, in addition to the degree of degradation of the selective catalytic reduction catalyst. In view of this, it is also possible to specify the quantity of ammonia supplied to a selective catalytic reduction catalyst, and perform degradation diagnosis by factoring in the decrease in heat generation quantity attributable to the specified quantity of ammonia supplied.

According to this method, degradation diagnosis of a selective catalytic reduction catalyst can be performed even when ammonia is supplied to the selective catalytic reduction catalyst. It should be noted, however, that in cases such as when variations occur in the quantity of ammonia that is supplied, there is a possibility that large diagnostic errors result. For this reason, it is preferable that degradation diagnosis of a selective catalytic reduction catalyst be performed within a period from the start-up of the internal combustion engine to the start of supply of ammonia.

The first aspect of the present invention relates to a malfunction diagnosis device for an exhaust gas purification system, including: an exhaust gas purification catalyst disposed in an exhaust passage of an internal combustion engine; a reductant supply device that supplies reductant to exhaust gas that flows upstream of the exhaust gas purification catalyst; detection means for detecting a physical quantity that correlates with a bed temperature of the exhaust gas purification catalyst; and catalyst degradation diagnosis means for diagnosing a degree of degradation of the exhaust gas purification catalyst based on the physical quantity that is detected by the detection means over a period from when the internal combustion engine is started to when the reductant supply device is activated. A selective catalytic reduction catalyst may be applied as the exhaust gas purification catalyst and urea may be applied as the reductant.

According to the above-mentioned aspect of the present invention, degradation diagnosis can be performed on the basis of the bed temperature of the selective catalytic reduction catalyst at the time when condensed moisture accumulated in the exhaust passage is supplied to the selective catalytic reduction catalyst. The bed temperature of the selective catalytic reduction catalyst correlates with the quantity of heat generated at the time when the selective catalytic reduction catalyst adsorbs moisture. Thus, the degree of degradation of the selective catalytic reduction catalyst can be diagnosed with high accuracy.

According to the above-mentioned aspect of the present invention, degradation diagnosis is performed at the time when the urea addition device is not adding urea. Thus, a decrease in diagnostic accuracy due to degradation/malfunction of the urea addition device can be prevented, and a deterioration in exhaust gas emissions (for example, a deterioration in exhaust gas emissions due to ammonia slip) can be prevented.

Further, according to the above-mentioned aspect of the present invention, degradation diagnosis can be performed without using a sensor for detecting the concentration of ammonia or nitrogen oxides. Thus, a decrease in diagnostic accuracy due to degradation/malfunction of the sensor can be also prevented.

In this regard, it is considered that moisture supplied to the selective catalytic reduction catalyst is adsorbed in accordance with the following tendency.

That is, moisture that has flown into a normal selective catalytic reduction catalyst is first adsorbed on the front end portion (the upstream end portion with respect to the flow direction of exhaust gas) of the selective catalytic reduction catalyst. After the quantity of moisture adsorbed on the front end portion reaches saturation, the moisture is then adsorbed on a section in a downstream side of the front end portion. Such displacement of the moisture-adsorbed section is repeated until the quantity of moisture adsorbed on the rear end potion reaches saturation.

According to this moisture adsorption tendency, the bed temperature of a normal selective catalytic reduction catalyst rises progressively from the front end portion toward the rear end portion. Thus, there is hardly rise in the bed temperature at the rear end portion of a normal selective catalytic reduction catalyst for some time after the start of moisture supply.

On the other hand, degradation of a selective catalytic reduction catalyst tends to proceed progressively from the front end portion toward the rear end portion. In other words, the moisture adsorption capacity of a selective catalytic reduction catalyst tends to gradually degrade from the front end portion toward the rear end portion. Thus, as degradation of a selective catalytic reduction catalyst proceeds, any moisture is hardly adsorbed on a section of the selective catalytic reduction catalyst closer to the front end portion, and moisture is adsorbed only on a section closer to the rear end portion.

According to this degradation tendency, it can be said that the timing at which the bed temperature at the rear end portion of a selective catalytic reduction catalyst starts to rise (hereinafter, referred to as "temperature rise timing") becomes earlier as the degradation of the selective catalytic reduction catalyst proceeds. Therefore, it can be considered that degradation of a selective catalytic reduction catalyst has proceeded further as the temperature rise timing at the rear end portion becomes earlier relative to the temperature rise timing in a normal condition (hereinafter, referred to as "base temperature rise timing").

Accordingly, the catalyst degradation diagnosis means according to the above-mentioned aspect of the present invention may specify the temperature rise timing at the rear end portion from the physical quantity detected by the detection means, and compare the specified temperature rise timing against the base temperature rise timing (normal value) to thereby diagnose whether or not the selective catalytic reduction catalyst is degraded, and/or the degree of the degradation.

When specifying the temperature rise timing, the catalyst degradation diagnosis means according to the above-mentioned aspect of the present invention may use the start-up timing of the internal combustion engine as a base. That is, the catalyst degradation diagnosis means may measure the elapsed time from the start-up of the internal combustion engine to the temperature rise timing. In that case, the catalyst degradation diagnosis means may use the elapsed time from the start-up of the internal combustion engine to the base temperature rise timing, as the object (normal value) against which the diagnosis result is to be compared.

Incidentally, the bed temperature at the rear end portion of a normal selective catalytic reduction catalyst is also subject to the influence of the heat of exhaust gas, other than the heat of moisture adsorption reaction. Thus, it is necessary to distinguish between a temperature rise due to the heat of moisture adsorption reaction and a temperature rise due to the heat of exhaust gas.

Immediately after the start-up of the internal combustion engine, most of the heat of exhaust gas is taken away by the portion of a selective catalytic reduction catalyst closer to the front end portion. Thus, the amount of temperature rise at the rear end portion due to the heat of exhaust gas becomes smaller than the amount of temperature rise due to the heat of moisture adsorption reaction.

Accordingly, the catalyst degradation diagnosis means may regard the timing at which the amount of temperature rise per unit time becomes greater than the amount of temperature rise (base value) due to the heat of exhaust gas, as the temperature rise timing due to the heat of moisture adsorption reaction.

The moisture that is adsorbed on a selective catalytic reduction catalyst starts to desorb from the selective catalytic reduction catalyst at the time when the bed temperature of the selective catalytic reduction catalyst has risen to a specific temperature or more (hereinafter, the above-mentioned specific temperature will be referred to "desorption temperature").

The timing at which the bed temperature of a selective catalytic reduction catalyst reaches the desorption temperature (hereinafter, referred to as "desorption start timing") becomes later as the degradation of the selective catalytic reduction catalyst proceeds. This is because the quantity of heat of moisture adsorption reaction generated decreases as the degradation of the selective catalytic reduction catalyst proceeds.

Therefore, it can be considered that degradation of a selective catalytic reduction catalyst has proceeded further as the desorption start timing becomes later relative to the desorption start timing in a normal condition (hereinafter, referred to as "base desorption start timing").

Accordingly, the catalyst degradation diagnosis means may specify the desorption start timing from the physical quantity that is detected by the detection means, and compare the specified desorption start timing against the base desorption start timing (normal value) to thereby diagnose whether or not the selective catalytic reduction catalyst is degraded, and/or the degree of the degradation.

An example of the method of specifying the desorption start timing is to specify the timing at which the bed temperature of a selective catalytic reduction catalyst has reached the desorption start temperature. The desorption temperature can be obtained experimentally in advance. Also, when moisture adsorbed on a selective catalytic reduction catalyst desorbs, the heat of the selective catalytic reduction catalyst is taken away by the desorbed moisture, so the bed temperature of the selective catalytic reduction catalyst drops. Thus, the desorption start timing may be specified by detecting a temperature drop due to a moisture desorption reaction.

By obtaining the base desorption start timing in advance, it is also possible to specify the degree of degradation of a selective catalytic reduction catalyst by using, as a parameter, the total quantity of heat that is generated in a period from the start-up of the internal combustion engine to the base desorption start timing.

As described above, the desorption start timing becomes later as the degradation of a selective catalytic reduction catalyst proceeds. Phrased differently, this means that the quantity of heat generated until the base desorption start timing becomes smaller as the degradation of a selective catalytic reduction catalyst proceeds.

Accordingly, the catalyst degradation diagnosis means according to the above-mentioned aspect of the present invention may specify the total quantity of heat that is generated by a selective catalytic reduction catalyst in a period (predetermined period) from the start-up of the internal combustion engine to the base desorption start timing based on the physical quantity that is detected by the detection means, and compare the specified total heat quantity against a normal value (total heat quantity generated by a normal selective catalytic reduction catalyst within the above-mentioned period) to thereby diagnose whether or not the selective catalytic reduction catalyst is degraded, and/or the degree of the degradation.

An example of the method of specifying the total heat quantity that is generated within the predetermined period mentioned above is to integrate the difference between the physical quantity that is detected by the detection means within the predetermined period and an initial value (physical quantity that is detected by the detection means at start-up of the internal combustion engine).

Incidentally, the heat quantity that is obtained by the above-mentioned method also includes the quantity of heat that is received by the selective catalytic reduction catalyst from exhaust gas, in addition to the quantity of heat of moisture adsorption reaction that is generated within the above-mentioned predetermined time. Accordingly, the catalyst degradation diagnosis means may use the bed temperature of a catalyst with no moisture adsorption capacity, instead of the initial value mentioned above. The heat quantity that is obtained by this method corresponds to the quantity of heat of moisture adsorption reaction that is generated within the predetermined period. As a result, it is possible to perform high-accuracy degradation diagnosis even when the quantity of heat that is received by the selective catalytic reduction catalyst from exhaust gas has changed.

It should be noted that the end timing of the predetermined period mentioned above is not limited to the base desorption start timing. In short, the above-mentioned end timing may be any timing as long as a clear difference occurs between the total heat quantity in a normal condition and the total heat quantity in a degraded condition.

The maximum value of bed temperature (hereinafter, referred to as "highest bed temperature") in a period during which a selective catalytic reduction catalyst is adsorbing moisture (for example, a period from the start-up of the internal combustion engine to the base desorption start timing) tends to become lower as the degradation of the selective catalytic reduction catalyst proceeds.

Accordingly, the catalyst degradation diagnosis means according to the above-mentioned aspect of the present invention may specify the highest bed temperature from the physical quantity that is detected by the detection means, and compare the specified highest bed temperature against a normal value to thereby diagnose whether or not the selective catalytic reduction catalyst is degraded, and/or the degree of the degradation.

In the above-mentioned aspect of the present invention, the temperature rise timing, the desorption start tinting, or the predetermined period mentioned above is specified on the basis of the elapsed time from the start-up of the internal combustion engine. However, this may be specified on the basis of an integrated intake air quantity from the start-up of the internal combustion engine (in other words, the integrated value of the quantity of gas that has passed through the selective catalytic reduction catalyst).

The temperature behavior of a selective catalytic reduction catalyst varies in some cases in accordance with the flow quantity of exhaust gas passing through the selective catalytic reduction catalyst. That is even when the degree of degradation of a selective catalytic reduction catalyst is the same, if the quantity of exhaust gas passing through the selective catalytic reduction catalyst at the time of degradation diagnosis varies, there is a possibility that the elapsed time from the start-up to the temperature rise timing, the elapsed time from the start-up to the desorption start timing, or the like also varies. In view of this, if the integrated intake air quantity is used instead of the elapsed time, a diagnostic error attributable to the operating state of the internal combustion engine can be reduced.

In the above-mentioned aspect of the present invention, the various normal values (threshold values) described above may be corrected depending on the temperature within the exhaust passage at start-up of the internal combustion engine, or the bed temperature of the selective catalytic reduction catalyst. This is due to the possibility that the quantity of condensed moisture varies depending on the temperature within the exhaust passage, or the maximum moisture quantity varies depending on the bed temperature of the selective catalytic reduction catalyst.

It should be noted that in the above-mentioned aspect of the present invention, an example of physical quantity that correlates with the bed temperature of the selective catalytic reduction catalyst is the detection value of a temperature sensor that directly detects the bed temperature of the selective catalytic reduction catalyst, the detection value of a temperature sensor that detects the temperature of exhaust gas flowing out of the selective catalytic reduction catalyst, or the like.

The parameter used for diagnosing the degree of degradation of the selective catalytic reduction catalyst is not limited to the above-mentioned parameters. Any parameter suffices as long as the difference between the maximum moisture quantity in a normal condition and the maximum moisture quantity in a degraded condition can be grasped quantitatively. Thus, parameters other than the above-mentioned parameters may be used as well.

For example, since the reaction heat at the time of moisture desorption (hereinafter, referred to as "heat of moisture desorption reaction") becomes greater as the maximum moisture quantity becomes larger, it is also possible to perform degradation diagnosis by using, as a parameter, a drop in bed temperature attributable to the heat of moisture desorption reaction.

Further, as the degradation of a selective catalytic reduction catalyst proceeds, the front end portion of the selective catalytic reduction catalyst rises in temperature by receiving solely the heat of exhaust gas. Thus, it is considered that the timing at which the bed temperature at the front end portion reaches a specified temperature or more becomes later as the degradation of the selective catalytic reduction catalyst proceeds. Therefore, it is also possible to perform degradation diagnosis by using, as a parameter, the timing at which the bed temperature at the front end portion reaches a specified temperature or more.

Next, a description will be given of the conditions in which the degradation diagnosis according to the above-mentioned aspect of the present invention can be executed.

The degradation diagnosis according to the above-mentioned aspect of the present invention needs to be carried out when a sufficient quantity of condensed moisture is present in the exhaust passage in an upstream side of a selective catalytic reduction catalyst. Thus, the above-mentioned degradation diagnosis cannot be carried out in a favorable manner when a sufficient quantity of condensed moisture is not present in the exhaust passage in the upstream side of the selective catalytic reduction catalyst.

Accordingly, the catalyst degradation diagnosis means according to the above-mentioned aspect of the present invention may not perform degradation diagnosis if the temperature within the exhaust passage at start-up of the internal combustion engine is higher than an evaporation start temperature. The evaporation start temperature is a value that is defined on the basis of the lower limit value of a temperature range in which condensed moisture can evaporate, and is preferably set to a value slightly lower than the lower limit value.

It should be noted that even when the temperature within the exhaust passage becomes equal to or lower than the evaporation start temperature, the moisture adsorption reaction does not readily occur if the bed temperature of a selective catalytic reduction catalyst is equal to or higher than the desorption temperature. In view of this, the catalyst degradation diagnosis means according to the above-mentioned aspect of the present invention may not perform degradation diagnosis also when the bed temperature of the selective catalytic reduction catalyst (physical quantity that is detected by the detection means) at start-up of the internal combustion engine is higher than the desorption start temperature. The desorption start temperature is a value that is defined on the basis of the desorption temperature of the selective catalytic reduction catalyst, and is preferably set to a value slightly higher than the desorption temperature.

If the temperature within the exhaust passage becomes excessively low, there is a possibility that condensed moisture freezes within the exhaust passage. Thus, the catalyst degradation diagnosis means according to the above-mentioned aspect of the present invention may not perform degradation diagnosis when the temperature within the exhaust passage is lower than a predetermined lower limit value. The predetermined lower limit value is a value that is defined on the basis of the temperature at which condensed moisture can freeze, and is preferably set to a value slightly lower than the temperature at which condensed moisture can freeze.

If the degree of degradation of a selective catalytic reduction catalyst is specified by the various methods mentioned above, it is possible to detect degradation or malfunction of the urea addition device attached to the selective catalytic reduction catalyst.

Accordingly, the malfunction diagnosis device according to the above-mentioned aspect of the present invention may further include the following elements in addition to the elements described above.

That is, the malfunction diagnosis device for an exhaust gas purification system according to the above-mentioned aspect of the present invention may further include: a $NO_x$ sensor that detects a concentration of nitrogen oxides contained in exhaust gas flowing out of the selective catalytic reduction catalyst; acquiring means for acquiring, when the urea addition device is adding urea in accordance with a target addition quantity, a correlation between an equivalence ratio, which is a ratio of the target addition quantity to a quantity of nitrogen oxides that flows into the selective catalytic reduction catalyst, and a $NO_x$ purification rate of the selective catalytic reduction catalyst, on the basis of a detection value of the $NO_x$ sensor and the target addition quantity; equivalence ratio specifying means for specifying an equivalence ratio at which the $NO_x$ purification rate is maximized in the correlation that is acquired by the acquiring means; computing means for computing an equivalence ratio at which the $NO_x$ purification rate of the selective catalytic reduction catalyst is maximized, based on a result of diagnosis by the catalyst degradation diagnosis means; and sub-diagnosis means for diagnosing degradation or malfunction of the urea addition device, by comparing the specified equivalence ratio by the equivalence ration specifying means and the equivalence ratio calculated by the computing means.

The term $NO_x$ purification rate as used herein refers to the ratio of the quantity of $NO_x$ that is purified by a selective catalytic reduction catalyst to the quantity of $NO_x$ that has flown into the selective catalytic reduction catalyst.

The equivalence ratio that is calculated by the computing means (hereinafter, referred to as "base equivalence ratio") is an equivalence ratio at which the $NO_x$ purification rate becomes maximum in the case when the actual quantity of addition by the urea addition device (hereinafter, referred to as "actual addition quantity") is in agreement with a target addition quantity. The computing means calculates the base equivalence ratio by using the degree of degradation of the selective catalytic reduction catalyst as a parameter. The correlation between the degree of degradation of the selective catalytic reduction catalyst and the base equivalence ratio may be obtained experimentally in advance.

The correlation acquired by the acquiring means is obtained on the basis of a detection value of the $NO_x$ sensor and a target addition quantity. The $NO_x$ sensor has a characteristic of also responding to ammonia in exhaust gas, in addition to $NO_x$ in exhaust gas. Thus, the above-mentioned correlation approximates to a parabola along which the $NO_x$ purification rate becomes maximum at the time when the $NO_x$ concentration and the ammonia concentration in exhaust gas become minimum. Thus, the equivalence ratio specifying means may obtain the equivalence ratio at the vertex of the above-mentioned parabola (hereinafter, referred to as "actual equivalence ratio").

The above-mentioned base equivalence ratio and the actual equivalence ratio have the following relationship. That is, when the actual addition quantity is in agreement with a target addition quantity, the actual equivalence ratio and the base equivalence ratio become substantially equal values. When the actual addition quantity differs from the target addition quantity, the actual equivalence ratio and the base equivalence ratio exhibit different values.

The above-mentioned equivalence ratio is a value that is dependent on the relative size of $NO_x$ purification rate, but is not dependent on the absolute value of $NO_x$ purification rate. Thus, as long as the $NO_x$ sensor can detect a relative change (increase/decrease) in $NO_x$ concentration, the above-mentioned relationship between the actual equivalence ratio and the base equivalence ratio holds. In other words, the relationship between the actual equivalence ratio and the base equivalence ratio holds even when an error is contained in the output signal value of the $NO_x$ sensor.

Therefore, the determining means can determine degradation or malfunction of the urea addition device by comparing the actual equivalence ratio and the base equivalence ratio against each other. For example, the determining means can determine the urea addition device to be malfunctioning, if the difference between the actual equivalence ratio and the base equivalence ratio exceeds a permissible value. Also, if the actual equivalence ratio and the base equivalence ratio differ from each other, and the difference between the two ratios is equal to or less than a permissible value, the determining means can determine that a decrease/increase in addition quantity attributable to clogging of an addition hole provided in the urea addition device, or aging or the like of a mechanism that closes and opens the addition hole has occurred.

If it is determined by the above-mentioned method that the urea addition device is not malfunctioning, it is also possible to specify the detection error of the $NO_x$ sensor. The absolute value of $NO_x$ purification rate that is acquired by the acquiring means is dependent on the actual addition quantity and the detection value of the $NO_x$ sensor. It should be noted, however, that when the actual equivalence ratio and the base equivalence ratio are in agreement with each other (when the actual addition quantity and the target addition quantity are in agreement with each other), the $NO_x$ purification rate is dependent solely on the detection value of the $NO_x$ sensor. Thus, if the absolute value of the $NO_x$ purification rate differs from a normal value, it can be determined that an error is contained in the detection value of the $NO_x$ sensor.

Accordingly, if the sub-diagnosis means diagnoses that the urea addition device is neither degraded nor malfunctioning, the sub-diagnosis means can diagnose degradation or malfunction of the $NO_x$ sensor by comparing the maximum value of the $NO_x$ purification rate in the correlation that is acquired by the acquiring means against a normal value.

The malfunction diagnosis for the $NO_x$ sensor mentioned above can be carried out when the actual equivalence ratio and the base equivalence ratio are in agreement with each other. Thus, even when it is diagnosed that the urea addition device is degraded, the above-mentioned malfunction diagnosis for the $NO_x$ sensor can be performed after the actual addition quantity is corrected so that the actual equivalence ratio is in agreement with the base equivalence ratio.

According to the above-mentioned aspect of the present invention, it is possible to enhance diagnostic accuracy in a malfunction diagnosis device for an exhaust gas purification system including a selective catalytic reduction catalyst.

The second aspect of the present invention relates to a malfunction diagnosis method for an exhaust gas purification system that includes an exhaust gas purification catalyst disposed in an exhaust passage of an internal combustion engine and a reductant supply device that supplies reductant to exhaust gas that flows upstream of the exhaust gas purification catalyst, the method including: detecting a physical quantity that correlates with a bed temperature of the exhaust gas purification catalyst; and diagnosing a degree of degradation of the exhaust gas purification catalyst based on the detected physical quantity over a period from when the internal combustion engine is started to when the reductant supply device is activated.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 14 is a diagram showing the highest bed temperature at the rear end portion at the time when a selective catalytic reduction catalyst adsorbs moisture;

DETAILED DESCRIPTION OF THE EXAMPLE EMBODIMENTS

Hereinbelow, specific embodiments of the present invention will be described with reference to the drawings. The dimensions, materials, shapes, relative disposition, and the like of components described in the embodiments are not intended to limit the technical scope of the invention unless otherwise specified.

First, a first embodiment of the present invention will be described with reference to FIGS. 1 to 8.

Figure 1:
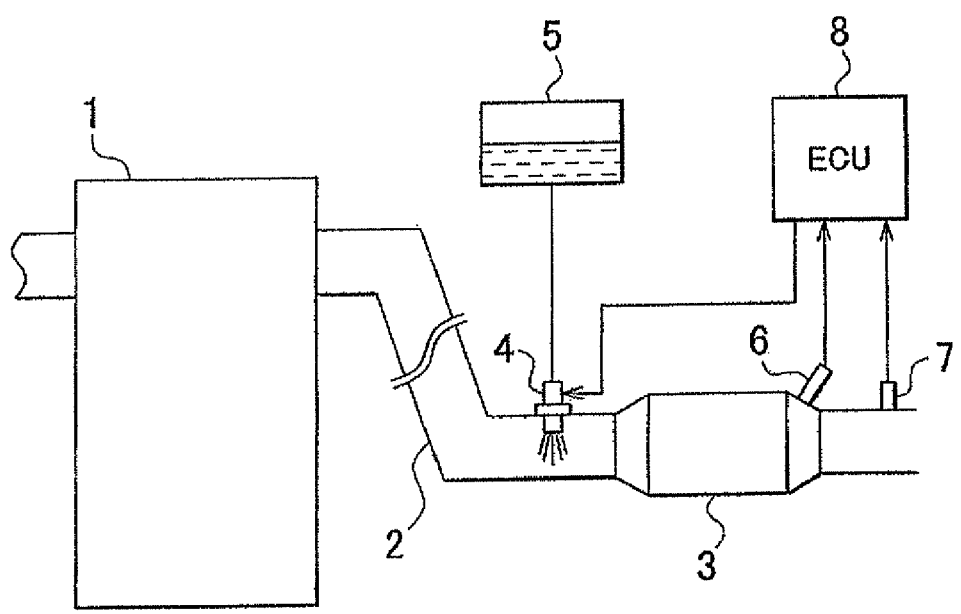
FIG. 1 is a diagram showing the schematic configuration of a malfunction diagnosis device for an exhaust gas purification system.

FIG. 1 is a diagram showing the schematic configuration of an exhaust gas purification system applied to an internal combustion engine. An internal combustion engine 1 shown in FIG. 1 is a compression ignition internal combustion engine (diesel engine) using light oil as fuel.

A selective catalytic reduction catalyst 3 is disposed in an exhaust passage 2 of the internal combustion engine 1. The selective catalytic reduction catalyst 3 is a catalyst that selectively adsorbs polar molecules such as ammonia, and reduces and purifies $NO_x$ exhaust gas by using the adsorbed ammonia as a reducing agent.

A urea addition valve 4 for adding a urea solution to exhaust gas flowing in an exhaust passage 2 is attached to the exhaust passage 2 in an upstream side of the selective catalytic reduction catalyst 3. A tank 5 that reserves a urea solution is connected to the urea addition valve 4. The urea addition valve 4 and the tank 5 represent an example of urea addition device according to the present invention.

The urea addition valve 4 adds the urea solution that is reserved in the tank 5 into exhaust gas when the selective catalytic reduction catalyst 3 is active. The urea solution added into the exhaust gas undergoes thermal decomposition and hydrolytic decomposition in the exhaust gas or the selective catalytic reduction catalyst 3 to produce ammonia. The produced ammonia is adsorbed on the selective catalytic reduction catalyst 3 to reduce $NO_x$ in the exhaust gas.

A temperature sensor 6 that detects the bed temperature of the selective catalytic reduction catalyst 3 is attached to the selective catalytic reduction catalyst 3. In this embodiment, the temperature sensor 6 is attached near the rear end portion of the selective catalytic reduction catalyst 3. The temperature sensor 6 corresponds to detection means according to the present invention.

An $NO_x$ sensor 7 that detects the concentration of $NO_x$ contained in exhaust gas is attached to the exhaust passage 2 in a downstream side of the selective catalytic reduction catalyst 3.

An ECU 8 is also provided in the exhaust gas purification system configured as described above. The ECU 8 is an electronic control unit that is configured by a CPU, a ROM, a RAM, a backup RAM, or the like. The ECU 8 receives output signals from various sensors including the temperature sensor 6 and the $NO_x$ sensor 7. Further, the urea addition valve 4 or the like is electrically connected to the ECU 8.

The ECU 8 controls the operating states of the urea addition valve 4 and the internal combustion engine 1 on the basis of the output signals from various sensors mentioned above. For example, in addition to known controls such as a fuel injection control and a urea addition control, the ECU 8 performs degradation diagnosis for the selective catalytic reduction catalyst 3.

Hereinafter, a degradation diagnosis method for the selective catalytic reduction catalyst 3 will be described.

The degradation diagnosis method according to this embodiment is a method of diagnosing the degree of degradation of the selective catalytic reduction catalyst 3 by using, as a parameter, the timing (temperature rise timing) at which the bed temperature at the rear end portion of the selective catalytic reduction catalyst 3 starts to rise due to a moisture adsorption reaction.

Figure 2:
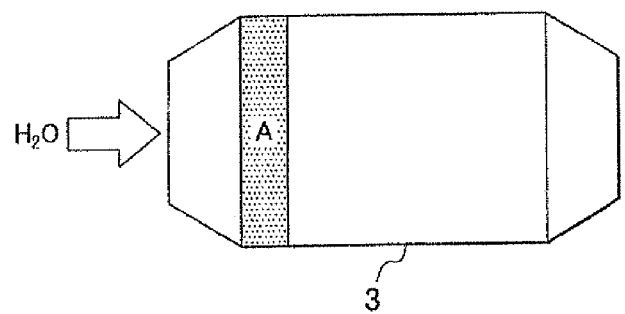
FIG. 2 is a first diagram showing the tendency of moisture adsorption by a selective catalytic reduction catalyst.
Figure 3:
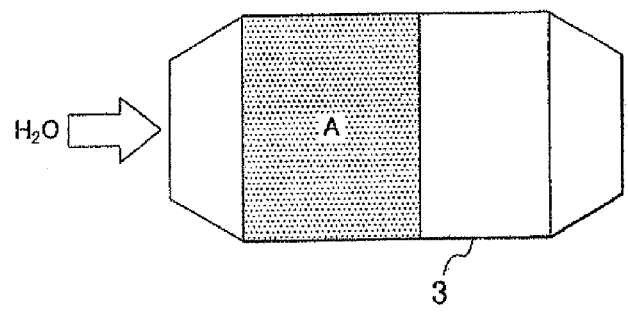
FIG. 3 is a second diagram showing the tendency of moisture adsorption by a selective catalytic reduction catalyst.
Figure 4:
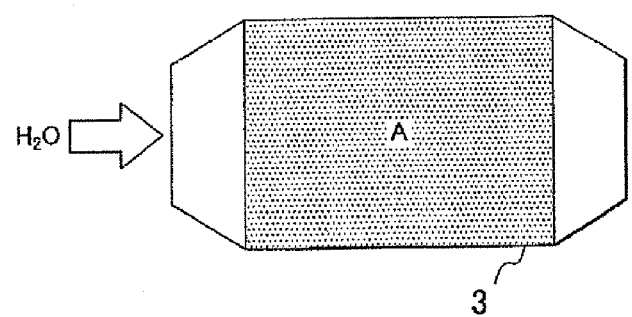
FIG. 4 is a third diagram showing the tendency of moisture adsorption by a selective catalytic reduction catalyst.

The selective catalytic reduction catalyst 3 has a characteristic of also polar-adsorbing moisture (water) similarly to ammonia. Moisture adsorption by the normal selective catalytic reduction catalyst 3 proceeds through a process as shown in FIGS. 2 to 4. It should be noted that a region A shown in FIGS. 2 to 4 indicates a section where moisture is adsorbed (moisture-adsorbed section).

Moisture that is supplied to the normal selective catalytic reduction catalyst 3 is first adsorbed near the front end portion of the selective catalytic reduction catalyst 3 (see FIG. 2). Thereafter, as the quantity of moisture that is adsorbed near the front end portion reaches saturation, moisture that cannot be adsorbed on the section near the front end portion is adsorbed onto a section closer to the rear end portion (see FIG. 3). In this way, the moisture-adsorbed section in the selective catalytic reduction catalyst 3 progressively expands from the front end portion toward the rear end portion, and finally expands to the rear end portion (see FIG. 4).

According to the above process, for some time after the start of moisture supply, a state continues in which no moisture is adsorbed on the rear end portion of the selective catalytic reduction catalyst 3. That is, for some time after the start of moisture supply, no heat of moisture adsorption reaction is generated at the rear end portion of the selective catalytic reduction catalyst 3.

Figure 5:
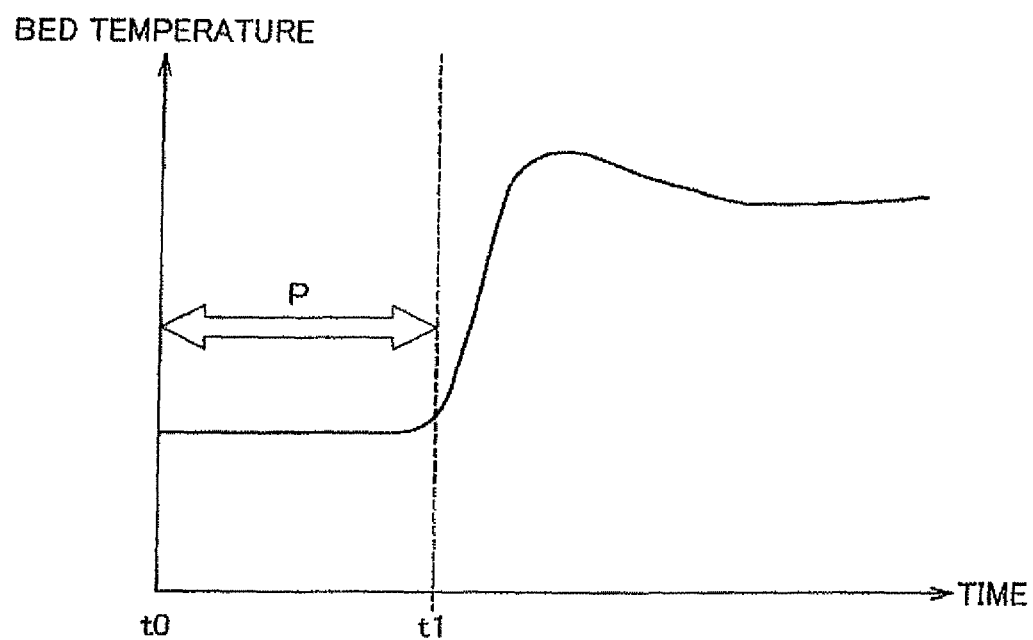
FIG. 5 is a diagram showing the bed temperature at the rear end portion in a case when a normal selective catalytic reduction catalyst adsorbs moisture.

Therefore, as shown in FIG. 5, there is hardly rise in the temperature at the rear end portion of the selective catalytic reduction catalyst 3 for some time P (hereinafter, referred to as "no-reaction period P") after the timing t0 of the start of moisture supply. Then, the temperature starts to rise abruptly at timing t1 when the heat of moisture adsorption reaction that is generated at a section closer to the front end portion is transmitted to the rear end portion, or when the heat of moisture adsorption reaction is generated near the rear end portion. Hereinafter, the timing t1 at which the rear end portion of the normal selective catalytic reduction catalyst 3 starts to abruptly rise in temperature will be referred to as "base temperature rise timing t1base".

On the other hand, the moisture adsorption capacity of the selective catalytic reduction catalyst 3 tends to degrade progressively from the front end portion of the selective catalytic reduction catalyst 3 toward the rear end portion. Thus, when moisture adsorption capacity of the selective catalytic reduction catalyst 3 degrades, moisture is no longer adsorbed near the front end portion of the selective catalytic reduction catalyst 3. This tendency becomes more pronounced as the degradation of the moisture adsorption capacity proceeds.

Figure 6:
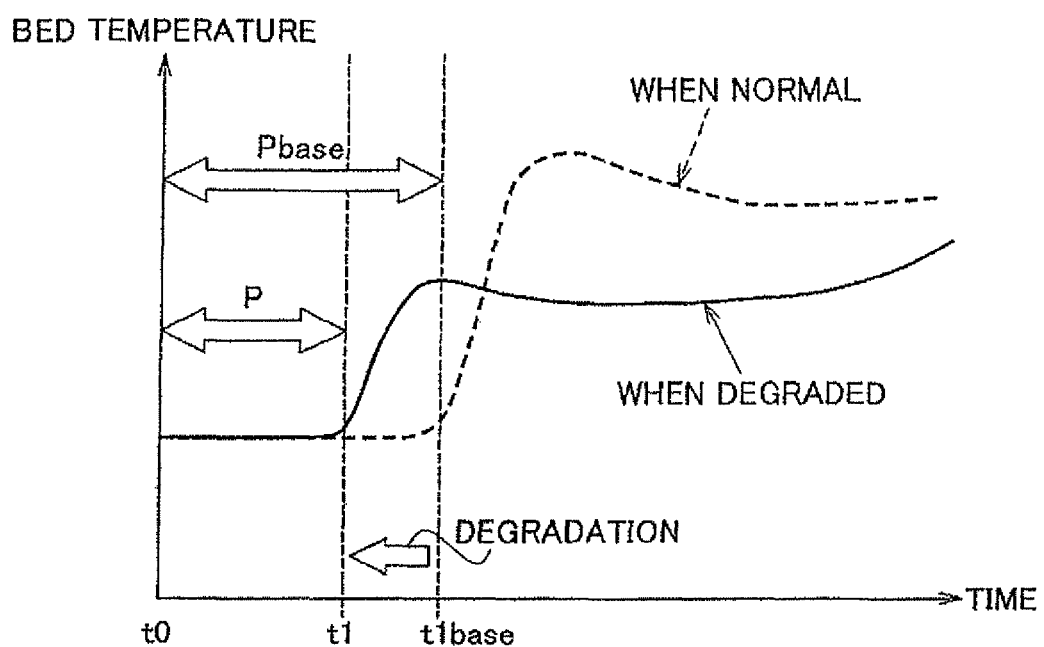
FIG. 6 is a diagram showing the bed temperature at the rear end portion in a case when a degraded selective catalytic reduction catalyst adsorbs moisture.

Therefore, as the degradation of the selective catalytic reduction catalyst 3 proceeds, the section on which moisture is adsorbed first after the start of moisture supply becomes closer to the rear end portion. As a result, as shown in FIG. 6, the timing (temperature rise timing) at which the rear end portion of the selective catalytic reduction catalyst 3 starts to rise in temperature becomes earlier as the degradation of the selective catalytic reduction catalyst 3 proceeds. This means that the no reaction time P becomes shorter as the degradation of the selective catalytic reduction catalyst 3 proceeds.

Accordingly, in the degradation diagnosis according to this embodiment, the ECU 8 is configured to measure the elapsed time (no reaction period P) from the start-up of the internal combustion engine 1 to the temperature rise timing t1, and compares the measurement result P against a normal value (no reaction period of the normal selective catalytic reduction catalyst 3) Pbase. At this time, the ECU 8 diagnoses the moisture adsorption capacity of the selective catalytic reduction catalyst 3 as being degraded if the difference between the no reaction period P and the normal value Pbase is larger than a permissible value. Further, the ECU 8 diagnoses the degree of degradation of moisture adsorption capacity to be higher (degradation has proceeded further) as the difference between the no reaction period P and the normal value Pbase becomes larger.

According to the degradation diagnosis method mentioned above, it is possible to diagnose whether or not the moisture adsorption capacity of the selective catalytic reduction catalyst 3 is degraded, and the degree of the degradation. The moisture adsorption capacity of the selective catalytic reduction catalyst 3 correlates with the ammonia adsorption capacity of the selective catalytic reduction catalyst 3, and the ammonia adsorption capacity of the selective catalytic reduction catalyst 3 correlates with the $NO_x$ purification capacity of the selective catalytic reduction catalyst 3.

The degradation diagnosis method according to this embodiment can be carried out when the urea addition valve 4 is not supplying ammonia. Thus, a decrease in diagnostic accuracy due to variations in ammonia addition quantity, and an increase in exhaust gas emissions due to ammonia slip can be also suppressed.

The degradation diagnosis according to this embodiment can be carried out without using an output signal of the $NO_x$ sensor 7. Thus, a decrease in diagnostic accuracy attributable to the output characteristics of the $NO_x$ sensor 7 can be also suppressed.

Figure 7:
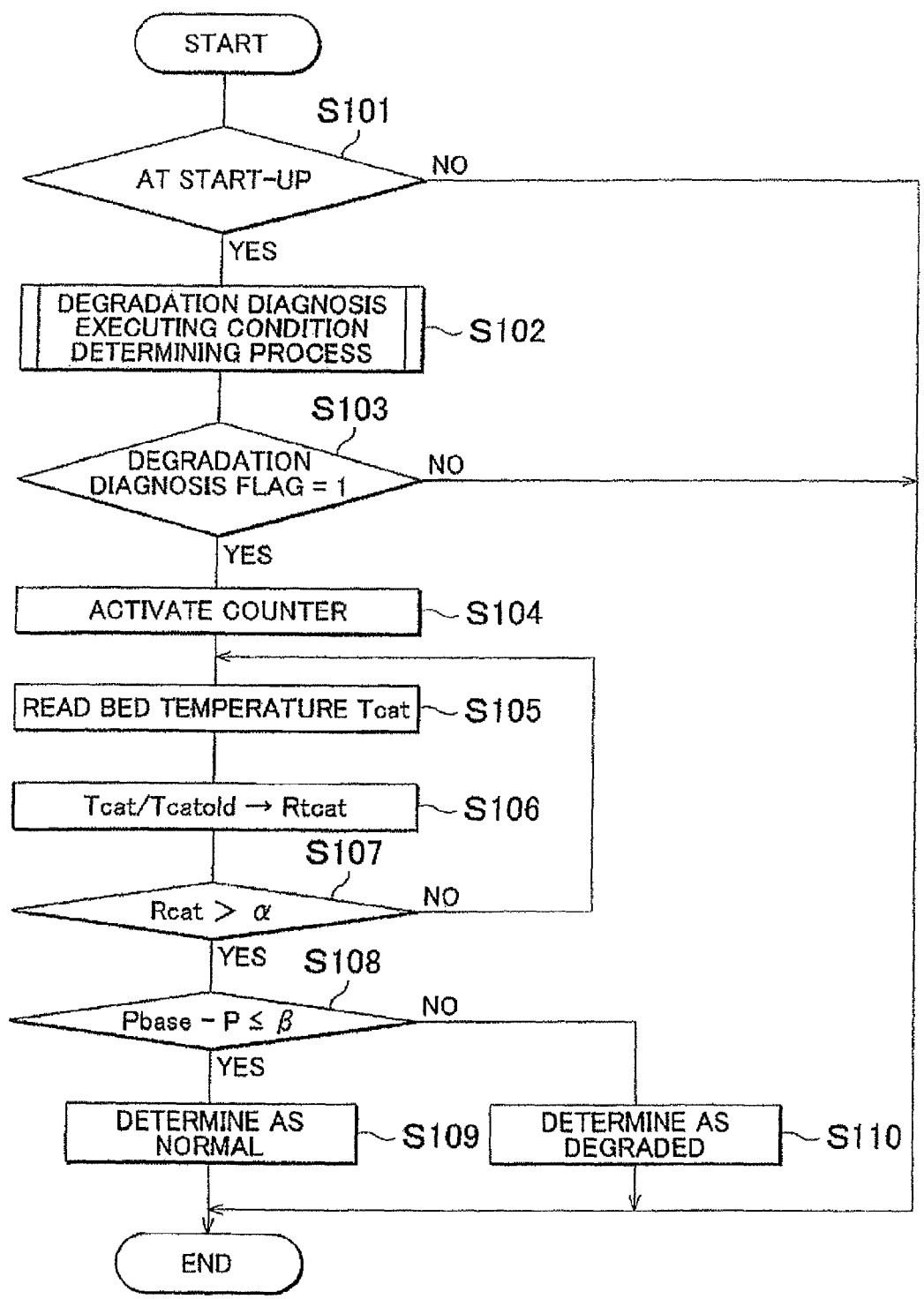
FIG. 7 is a flowchart showing a degradation diagnosis routine according to a first embodiment.

Next, the execution procedure of the degradation diagnosis method according to this embodiment will be described with reference to FIG. 7. FIG. 7 is a flowchart showing a degradation diagnosis routine according to this embodiment. This degradation diagnosis routine is stored in the ROM or the like of the ECU 8 in advance, and is executed by the ECU 8 with the beginning of the start-up of the internal combustion engine 1 as a trigger.

In the degradation diagnosis routine, the ECU 8 first determines in S101 whether or not the internal combustion engine 1 is at start-up. An example of this determination method is to determine whether or not the ignition switch has been switched from OFF to ON, or whether or not the starter switch has been switched from OFF to ON. The internal combustion engine 1 is regarded as being at start-up if a position determination is made by one of the two determination methods mentioned above.

If a negative determination is made in S101 mentioned above, the ECU 8 terminates the execution of this routine. If a positive determination is made in S101 mentioned above, the ECU 8 proceeds to S102.

In S102, the ECU 8 determines whether or not degradation diagnosis executing conditions are met. This determination is performed in accordance with a sub-routine shown in FIG. 8.

Figure 8:
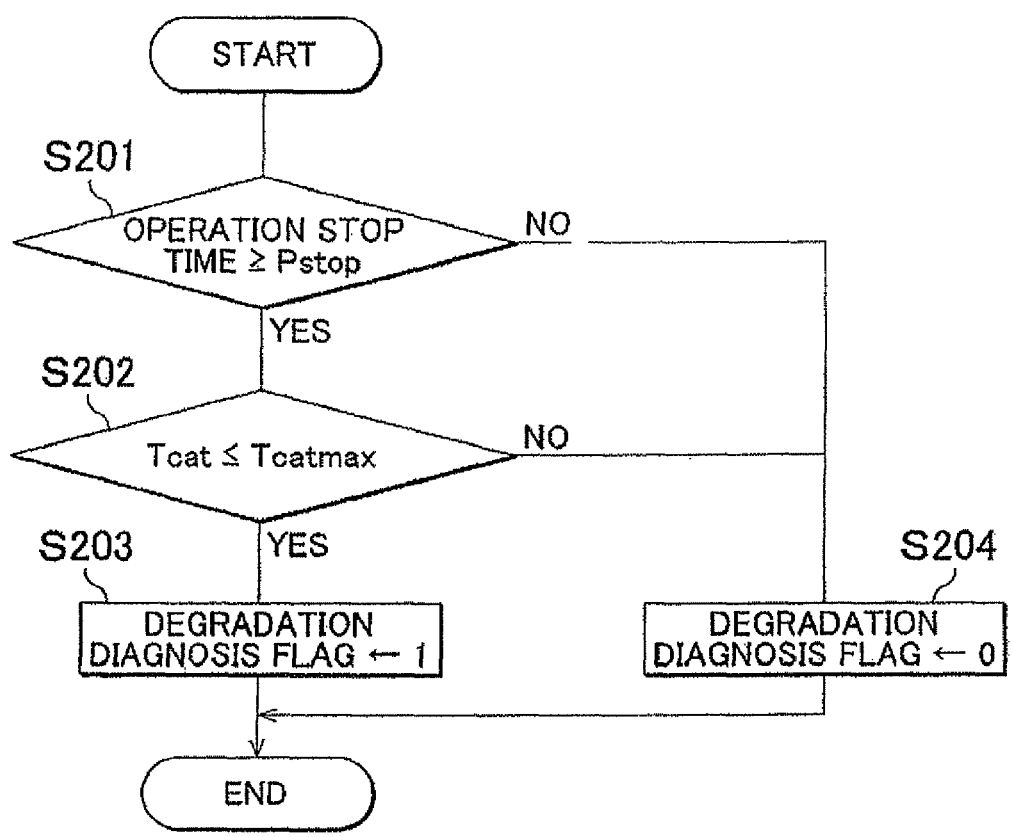
FIG. 8 is a flowchart showing a degradation diagnosis executing condition determining process routine.

In the sub-routine shown in FIG. 8, the ECU 8 first determines in S201 whether or not a sufficient quantity of condensed moisture has accumulated within the exhaust passage 2 in the upstream side of the selective catalytic reduction catalyst 3.

An example of this determination method is to determine whether or not the operation stop time (the elapsed time from the last operation stop to the current start-up) is equal to or more than a predetermined time Pstop.

The predetermined time Pstop is the minimum time required for a suitable quantity of condensed moisture to accumulate within the exhaust passage 2 in the upstream side of the selective catalytic reduction catalyst 3. In other words, the predetermined time Pstop is the minimum time required for the temperature within the exhaust passage 2 to drop to a temperature equal to or below an evaporation start temperature. The above-mentioned evaporation start temperature is a temperature slightly lower than the lower limit value of a temperature range in which condensed moisture can evaporate.

Since temperature variations within the exhaust passage 2 are subject to the influence of the outside air temperature, the predetermined time Pstop may be corrected in accordance with the outside air temperature at the time of the last operation stop and/or the current start-up.

Another example of the method for determining whether or not a sufficient quantity of condensed moisture has accumulated within the exhaust passage 2 in the upstream side of the selective catalytic reduction catalyst 3 is to attach a temperature sensor in the exhaust passage in the 2 upstream side of the selective catalytic reduction catalyst 3, and determine whether or not the output signal value of the temperature sensor is lower than the evaporation start temperature.

If a negative determination is made in S201 mentioned above, the ECU 8 proceeds to S204. In S204, the ECU 8 sets a degradation diagnosis flag to "0". The degradation diagnosis flag is a storage area set in a RAM or backup RAM. This degradation diagnosis flag is set to "1" when the degradation diagnosis executing conditions are met, and is reset to "0" when the degradation diagnosis executing conditions are not met.

If a positive determination is made in S201 mentioned above, the ECU 8 proceeds to S202. In S202, the ECU 8 determines whether or not the selective catalytic reduction catalyst 3 is in a state that allows adsorption of moisture. For example, the ECU 8 determines whether or not an output signal value (bed temperature of the selective catalytic reduction catalyst 3) Tcat of the temperature sensor 6 is equal to or lower than a desorption start temperature Tcatmax. The desorption start temperature Tcatmax is a temperature slightly lower than a temperature (desorption temperature) at which moisture adsorbed on the selective catalytic reduction catalyst 3 starts to desorb.

If a negative determination is made in S202 mentioned above (Tcat>Tcatmax), the ECU 8 proceeds to S204. If a positive determination is made in S202 mentioned above (Tcat≦Tcatmax), the ECU 8 proceeds to S203. In S203, the ECU 8 sets the degradation diagnosis flag to "1".

Incidentally, in cases when the temperature within the exhaust passage 2 becomes extremely low, there is a possibility that condensed moisture within the exhaust passage 2 freezes. Accordingly, the ECU 8 may set the degradation diagnosis flag to "0" when the temperature within the exhaust passage 2 falls below a lower limit value. The lower limit value is a temperature slightly higher than the upper limit value of a temperature range in which condensed moisture can freeze.

Now, returning to FIG. 7, the ECU 8 determines in S103 whether or not the degradation diagnosis flag is set to "1". If a negative determination is made (degradation diagnosis flag=0) in S103 mentioned above, the ECU 8 terminates the execution of this routine. If a positive determination is made (degradation diagnosis flag=1) in S103 mentioned above, the ECU 8 proceeds to S104.

In S104, the ECU 8 activates a counter. This counter measures the elapsed time from the start-up of the internal combustion engine 1.

Subsequently, the ECU 8 repeatedly executes the processes in S105 to S107 in order to specify the temperature rise timing t1 at the rear end portion of the selective catalytic reduction catalyst 3.

In S105, the ECU 8 reads the output signal value (bed temperature) Tcat of the temperature sensor 6.

In S106, the ECU 8 divides the bed temperature Tcat that is read in S105 mentioned above by the previous value (bed temperature read at the previous execution of S105) Tcatold to calculate a rate of change Rcat (=Tcat/Tcatold). When the process in S105 is executed for the first time after the start-up of the internal combustion engine 1, the bed temperature Tcat that is read in S202 in FIG. 8 described above may be used as the previous value Tcatold.

In S107, the ECU 8 determines whether or not the rate of change Rcat that is calculated in S106 mentioned above exceeds a base value α. The base value α corresponds to a rate of change in the case when the selective catalytic reduction catalyst 3 is heated only with the heat of exhaust gas.

While the base value α may be a specific value, the base value α may also be a variable value that is changed in accordance with the bed temperature of the selective catalytic reduction catalyst 3, the outside air temperature, the temperature within the exhaust passage 2, or the like at start-up of the internal combustion engine 1. This is based on the finding of the inventor of the present application that when the bed temperature, the outside air temperature, or the temperature within the exhaust passage 2 at start-up of the internal combustion engine 1 changes, the rate of change Rcat changes in some cases even if the degree of degradation of the selective catalytic reduction catalyst 3 is constant. Accordingly, if the base value α is changed in accordance with the bed temperature, the outside air temperature, the temperature within the exhaust passage 2, or the like at start-up of the internal combustion engine 1, the accuracy of degradation diagnosis can be further enhanced.

While this embodiment is directed to the example in which the rate of change Rcat of the bed temperature Tcat is compared against a base value, as a matter of course, a difference in bed temperature Tcat (amount of temperature rise) may be compared against a base value. In short, any parameter may be used as long as the timing of temperature rise due to a moisture adsorption reaction can be grasped quantitatively.

If a negative determination is made (Rcat≦α) in S107 mentioned above, the ECU 8 returns to S105. If a positive determination is made (Rcat>α) in S107 mentioned above, the ECU 8 proceeds to S108.

In S108, the ECU 8 acquires a measured time P of the counter at the present time. The measured time P thus acquired is a value corresponding to the no reaction period described above. The ECU 8 determines whether or not a difference between the measured time P and the normal value (base no reaction period) Pbase (=Pbase−P) is equal to or less than a permissible value β. The permissible value β is set on the basis of the difference (=Pbase−P) in the case when the selective catalytic reduction catalyst 3 has degraded to an extent that requires correction of the addition quantity of urea.

While the permissible value β may be a specific value, the permissible value β may of course be a variable value that is changed in accordance with the bed temperature of the selective catalytic reduction catalyst 3, the outside air temperature, the temperature within the exhaust passage 2, or the like at start-up of the internal combustion engine 1. If the permissible value β is changed in accordance with the bed temperature, the outside air temperature, the temperature within the exhaust passage 2, or the like at start-up of the internal combustion engine 1, the accuracy of degradation diagnosis can be further enhanced.

If a positive determination is made ((Pbase−P)≦β) in S108 mentioned above, the ECU 8 proceeds to S109, and determines that the selective catalytic reduction catalyst 3 is normal.

On the other band, if a negative determination is made ((Pbase−P)>β) in S108 mentioned above, the ECU 8 proceeds to S110, and determines that the selective catalytic reduction catalyst 3 is degraded. At this time, the ECU 8 determines the degree of degradation of the selective catalytic reduction catalyst 3 to be higher as the difference between the measured time P and the base no reaction period Pbase becomes larger.

The catalyst degradation diagnosis means according to the present invention is realized by the ECU 8 executing the routines in FIGS. 7 and 8 in the manner as described above. As a result, whether or not the selective catalytic reduction catalyst 3 is degraded, and/or the degree of the degradation of the selective catalytic reduction catalyst 3 can be diagnosed with good accuracy.

Incidentally, cases are also conceivable in which, depending on the previous operating state of the internal combustion engine 1, or the environment or the like during the stoppage of the operation of the internal combustion engine 1, the quantity of condensed moisture within the exhaust passage 2 becomes smaller than an assumed value. In such cases, there is a possibility that the bed temperature at the rear end portion of the selective catalytic reduction catalyst 3 does not exhibit an abrupt increase. As a result, a situation can arise in which the ECU 8 continues to repeatedly execute the processes in S105 to S107 mentioned above.

In view of this, the ECU 8 may be configured to discontinue the execution of the malfunction diagnosis routine when the measured time of the counter exceeds a specific time, or when the bed temperature at the rear end portion of the selective catalytic reduction catalyst 3 exceeds a specific temperature.

While this embodiment is directed to the example in which degradation diagnosis of the selective catalytic reduction catalyst 3 is performed by using as a parameter the timing of temperature rise due to a moisture adsorption reaction, degradation diagnosis of the selective catalytic reduction catalyst 3 may be performed by using as a parameter the timing (desorption start timing) at which a moisture desorption reaction is started.

While this embodiment is directed to the example in which the temperature sensor 6 is attached near the rear end portion of the selective catalytic reduction catalyst 3, similar degradation diagnosis can be performed even when the temperature sensor 6 is attached in the exhaust passage 2 immediately downstream of the selective catalytic reduction catalyst 3.

Incidentally, the above-mentioned degradation diagnosis method cannot be carried out in a favorable manner in a case where the temperature sensor is attached near the front end portion of the selective catalytic reduction catalyst 3. However, the amount (rate of change) of temperature rise near the front end portion of the selective catalytic reduction catalyst 3 becomes more moderate as the degradation of the selective catalytic reduction catalyst 3 proceeds. This is because the quantity of heat of moisture adsorption reaction that is generated near the front end portion decreases as the degradation of the selective catalytic reduction catalyst 3 proceeds.

Therefore, in the case where the temperature sensor is attached near the front end portion of the selective catalytic reduction catalyst 3, degradation of the selective catalytic reduction catalyst 3 can be diagnosed as having proceeded further as the rate of change near the front end portion becomes smaller relative to a normal value.

Figure 9:
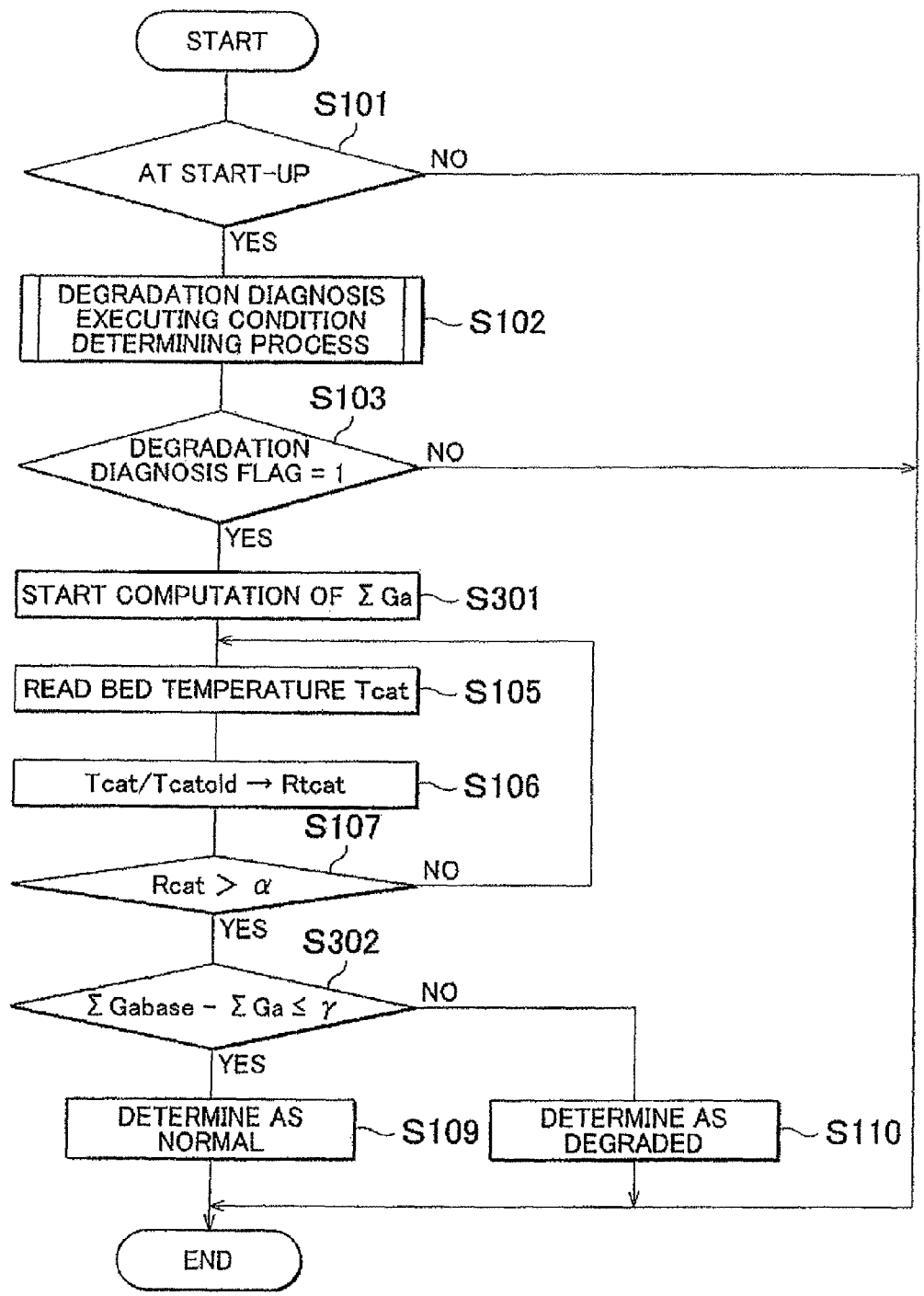
FIG. 9 is a flowchart showing a degradation diagnosis routine according to a second embodiment.

Next, a second embodiment of the present invention will be described with reference to FIG. 9. A description will be given here of configurations different from those of the first embodiment described above, and description of similar configurations is not repeated.

The first embodiment described above is directed to the example in which degradation and/or the degree of degradation of the selective catalytic reduction catalyst 3 is diagnosed on the basis of the elapsed time (the length of time of the no reaction period P) from the start-up of the internal combustion engine 1 to the temperature rise timing t1.

The quantity of heat that is received by a selective catalytic reduction catalyst from exhaust gas varies in accordance with the flow quantity of exhaust gas that passes through the selective catalytic reduction catalyst 3. Thus, there is a possibility that the temperature rise timing varies in accordance with the flow quantity of exhaust gas that passes through the selective catalytic reduction catalyst.

In view of this, while it is conceivable to employ a method of correcting the base value α or the rate of change Rcat in accordance with an integrated exhaust gas flow quantity in the no reaction period P, in this embodiment, degradation and/or the degree of degradation of the selective catalytic reduction catalyst 3 is diagnosed on the basis of an integrated intake air quantity from the start-up of the internal combustion engine 1 to the temperature rise timing t1 (integrated intake air quantity in the no reaction period P) ΣGa.

Hereinbelow, the execution procedure of a degradation diagnosis method according to this embodiment will be described with reference to FIG. 9. FIG. 9 is a flowchart showing a degradation diagnosis routine according to this embodiment. In FIG. 9, processes similar to those of the first embodiment (see FIG. 7) described above are denoted by the same symbols.

If a positive determination is made (degradation diagnosis flag=1) in S103, the ECU 8 executes S301 instead of S104. In S301, the ECU 8 starts computation of the integrated intake air quantity ΣGa. An example of the method of computing the integrated intake air quantity ΣGa is to integrate an intake air quantity that is periodically detected by an airflow meter (not shown).

If a positive determination is made (Rcat>α) in S107, the ECU 8 executes S302 instead of S108. In S302, the ECU 8 determines whether or not the difference (=ΣGbase−ΣGa) between the integrated intake air quantity ΣGa and a base value ΣGbase at the present time is equal to or less than a permissible value γ. The base value ΣGbase corresponds to the integrated intake air quantity in the base no reaction period Pbase. The permissible value γ is set on the basis of the difference (=ΣGbase−ΣGa) in the case when the selective catalytic reduction catalyst 3 has degraded to an extent that requires correction of the addition quantity of urea.

According to the diagnosis method described above, high-accuracy degradation diagnosis can be performed even when the temperature rise timing has changed due to the influence of exhaust gas flow quantity.

Next, a third embodiment of the present invention will be described with reference to FIGS. 10 to 13. A description will be given here of configurations different from those of the first embodiment described above, and description of similar configurations is not repeated.

The first embodiment described above is directed to the example in which degradation and/or the degree of degradation of the selective catalytic reduction catalyst 3 is diagnosed on the basis of the elapsed time from the start-up of the internal combustion engine 1 to the temperature rise timing t1.

In contrast, in this embodiment, a description will be given of an example in which degradation and/or the degree of degradation of the selective catalytic reduction catalyst 3 is diagnosed on the basis of the quantity of heat of moisture adsorption reaction that is generated in a predetermined period from the start-up of the internal combustion engine 1.

Figure 10:
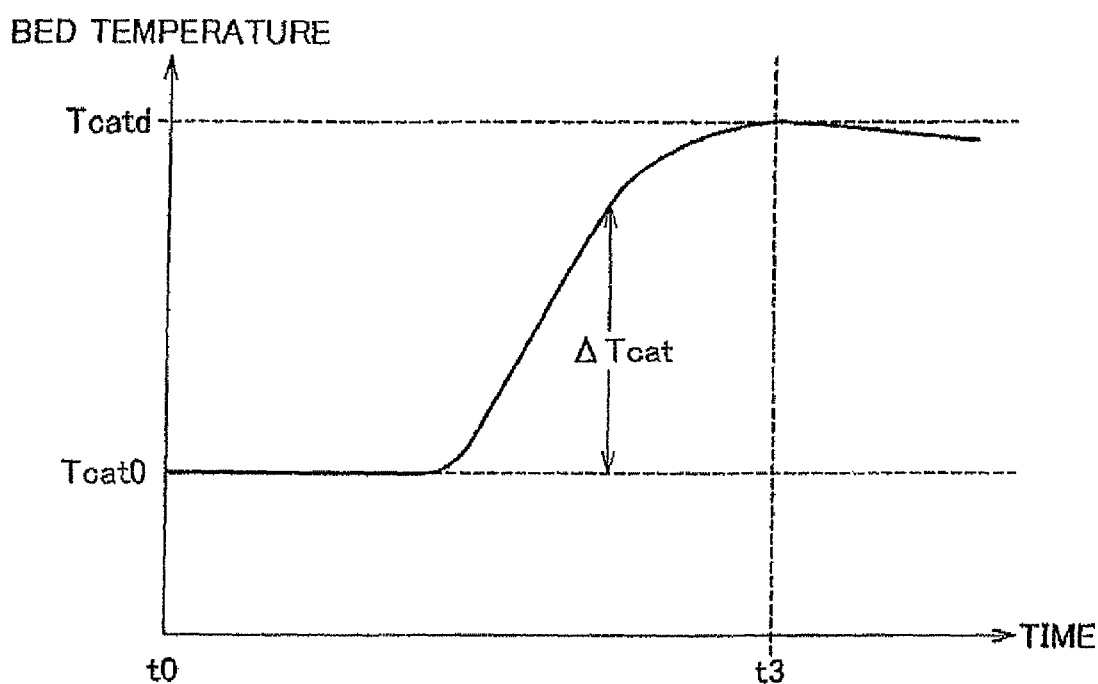
FIG. 10 is a first diagram showing a method of obtaining the quantity of heat that is generated by a selective catalytic reduction catalyst within a predetermined period front the start-up of an internal combustion engine.

First, as shown in FIG. 10, the ECU 8 integrates the difference ΔTcat (=Tcat−Tcat0) between the bed temperature Tcat that is detected by the temperature sensor 6 and an initial value (bed temperature Tcat0 that is detected by the temperature sensor 6 at start-up of the internal combustion engine 1), over a predetermined period (the period from t0 to t3 in FIG. 10) from the start-up of the internal combustion engine 1.

Figure 11:
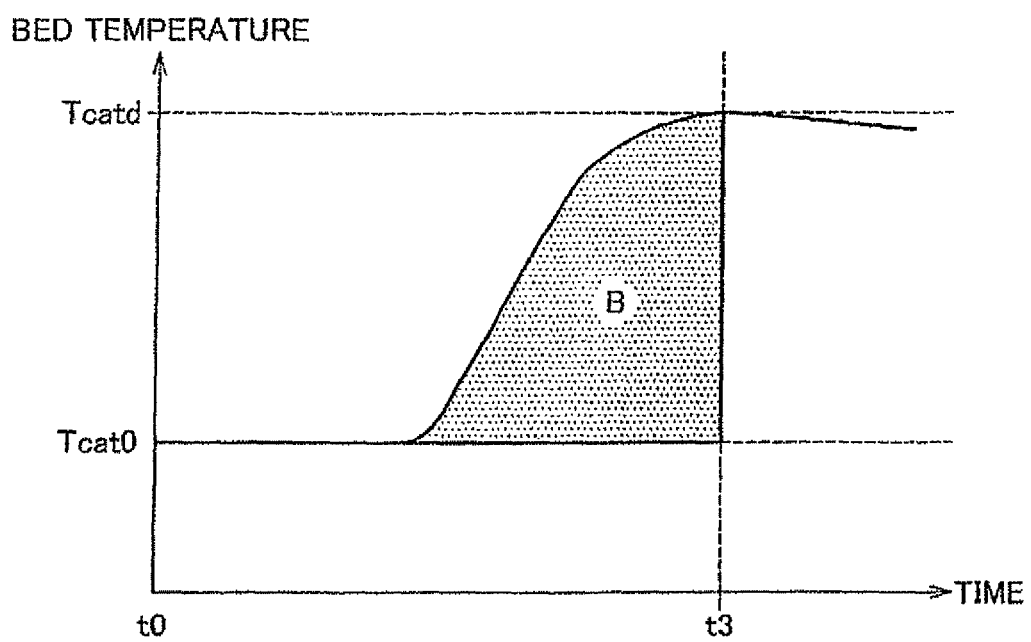
FIG. 11 is a second diagram showing a method of obtaining the quantity of heat that is generated by a selective catalytic reduction catalyst within a predetermined period from the start-up of an internal combustion engine.

The integrated value ΣΔTcat of the difference ΔTcat corresponds to the area of a region B shown in FIG. 11. The area of the region B corresponds to the sum of the quantity of heat that is generated by the selective catalytic reduction catalyst 3 (including the heat of moisture adsorption reaction that is generated near the rear end portion of the selective catalytic reduction catalyst 3, and the heat of moisture adsorption reaction that is generated at a section closer to the front end portion) and the quantity of heat that is received by the selective catalytic reduction catalyst 3 from exhaust gas in the predetermined period. That is, the integrated value ΣΔTcat includes the quantity of heat that is received by the selective catalytic reduction catalyst 3 from exhaust gas, in addition to the quantity of heat of moisture adsorption reaction that is generated in the predetermined period.

The quantity of heat that is received by the selective catalytic reduction catalyst 3 from exhaust gas within the predetermined period varies in accordance with the operating state (for example, intake air quantity, engine speed, load, and the like) of the internal combustion engine 1. Thus, the integrated value ΣΔTcat varies in accordance with not only the quantity of heat of moisture adsorption reaction that is generated, but also the operating state of the internal combustion engine 1.

However, if the above-mentioned integration process is performed on the condition that the operating state of the internal combustion engine 1 in the predetermined period is in agreement with a predetermined operating state, the integrated value ΣΔTcat is made to correlate with the quantity of heat of moisture adsorption reaction that is generated in the predetermined period.

Accordingly, the ECU 8 is configured to perform the above-mentioned integration process on the condition that the operating state of the internal combustion engine 1 in the predetermined period is in agreement with a predetermined steady operating state (for example, an idle operating state).

Incidentally, if the end timing t3 of the above-mentioned predetermined period is set carelessly, cases may occur in which the quantity of heat of moisture adsorption reaction that is generated in the predetermined period does not correlate with the degree of degradation of the selective catalytic reduction catalyst 3. For this reason, the end timing t3 needs to be set in such a way that a clear difference occurs between the integrated value ΣΔTcat in a normal condition and the integrated value ΣΔTcat in a degraded condition.

While a suitable value obtained experimentally in advance may be used as the end timing t3 that satisfies the above-mentioned condition, in this embodiment, base desorption start timing (timing at which the bed temperature Tcat of the normal selective catalytic reduction catalyst 3 reaches a desorption temperature Tcatd) is used.

The desorption start timing of moisture that is adsorbed on the selective catalytic reduction catalyst 3 becomes later as the degradation of the selective catalytic reduction catalyst 3 proceeds. Thus, it can be said that the quantity of heat of moisture adsorption heat that is generated in the period from the start-up of the internal combustion engine 1 to the base desorption start timing becomes smaller as the degradation of the selective catalytic reduction catalyst 3 proceeds.

Therefore, if the base desorption start timing is set as the end timing t3, a clear difference occurs between the integrated value ΣΔTcat in a normal condition and the integrated value ΣΔTcat in a degraded condition. As a result, it is possible to diagnose the degree of degradation of the selective catalytic reduction catalyst 3 with good accuracy.

Figure 12:
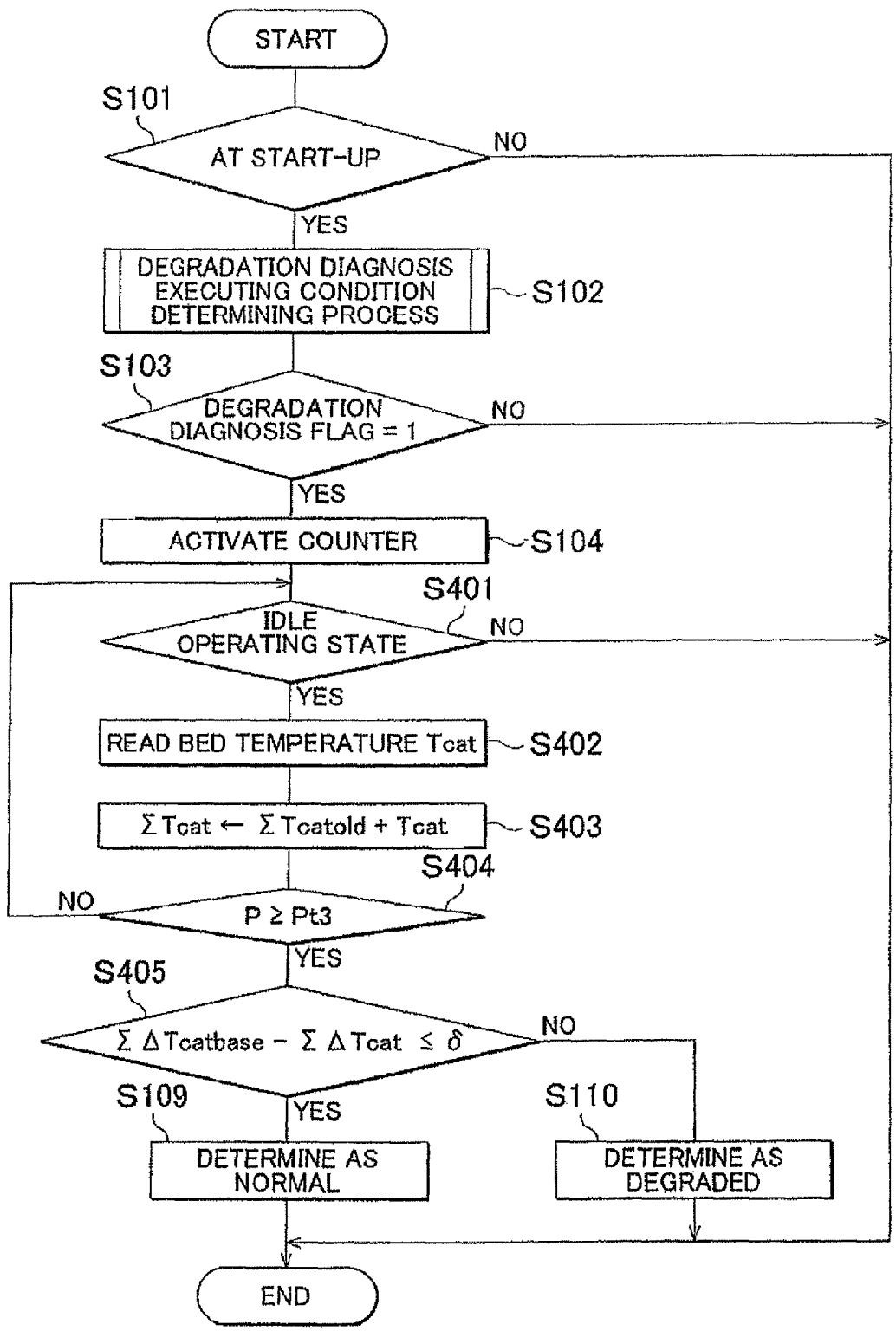
FIG. 12 is a flowchart showing a degradation diagnosis routine according to a third embodiment.

Hereinbelow, the execution procedure of a degradation diagnosis method according to this embodiment will be described with reference to FIG. 12. FIG. 12 is a flowchart showing a degradation diagnosis routine according to this embodiment. In FIG. 12, processes similar to those of the first embodiment (see FIG. 7) described above are denoted by the same symbols.

After executing the process in S103, the ECU 8 executes the processes in S401 to S405 instead of S105 to S108.

In S401, the ECU 8 determines whether or not the internal combustion engine 1 is in an idle operating state. If a negative determination is made in S401, the ECU 8 terminates the execution of this routine. On the other hand, if a positive determination is made in S401, the ECU 8 proceeds to S402.

In S402, the ECU 8 reads the output signal value (bed temperature) Tcat of the temperature sensor 6. In S403 that follows, first, the ECU 8 computes the difference ΔTcat (=Tcat−Tcat0) between the bed temperature Tcat read in S402 mentioned above and the initial value Tcat0. Then, the ECU 8 adds the above-mentioned difference ΔTcat to the integrated value ΣΔTcatold that is calculated up to the previous time to calculate a new integrated value ΣΔTcat. When the process in S403 is executed for the first time, the value of ΣΔTcatold is set to "0".

In S404, the ECU 8 determines whether or not the measured time P of the counter is equal to or more than a base time Pt3. The base time Pt3 is a time that is required from the start-up of the internal combustion engine 1 to the base adsorption start timing, and is a value that is obtained experimentally in advance.

If a negative determination is made (P<Pt3) in S404 mentioned above, the ECU 8 returns to S401 mentioned above. On the other than, if a positive determination is made (P≧Pt3) in S404 mentioned above, the ECU 8 proceeds to S405.

In S405, the ECU 8 determines whether or not the difference (=ΣΔTcatbase−ΣΔTcat) between the integrated value ΣΔTcat that is calculated in S403 mentioned above, and a base integrated value ΣΔTcatbase is equal to or less than a permissible value δ.

The base integrated value ΣΔTcatbase is the integrated value ΣΔTcat when the selective catalytic reduction catalyst 3 is normal. The permissible value δ is set on the basis of the difference (=ΣΔTcatbase−ΣΔTcat)), in the case when the selective catalytic reduction catalyst 3 has degraded to an extent that requires correction of the addition quantity of urea.

If a positive determination is made ((ΣΔTcatbase−ΣΔTcat) ≦δ) in S405 mentioned above, the ECU 8 proceeds to S109, and diagnoses that the selective catalytic reduction catalyst 3 is normal.

If a negative determination is made ((ΣΔTcatbase−ΣΔTcat)≦δ) in S405 mentioned above, the ECU 8 proceeds to S110, and diagnoses that the selective catalytic reduction catalyst 3 is degraded. At this time, the ECU 8 determines the degree of degradation of the selective catalytic reduction catalyst 3 to be higher as the difference between the integrated value ΣΔTcat and the base integrated value ΣΔTcatbase becomes larger.

According to the degradation diagnosis method as described above, an effect similar to that of the first embodiment described above can be attained.

According to the above-mentioned degradation diagnosis method, degradation diagnosis is discontinued when the operating state of the internal combustion engine 1 deviates from a steady operating state within a predetermined period. Thus, there is a possibility that the number of occasions on which degradation diagnosis can be carried decreases.

Figure 13:
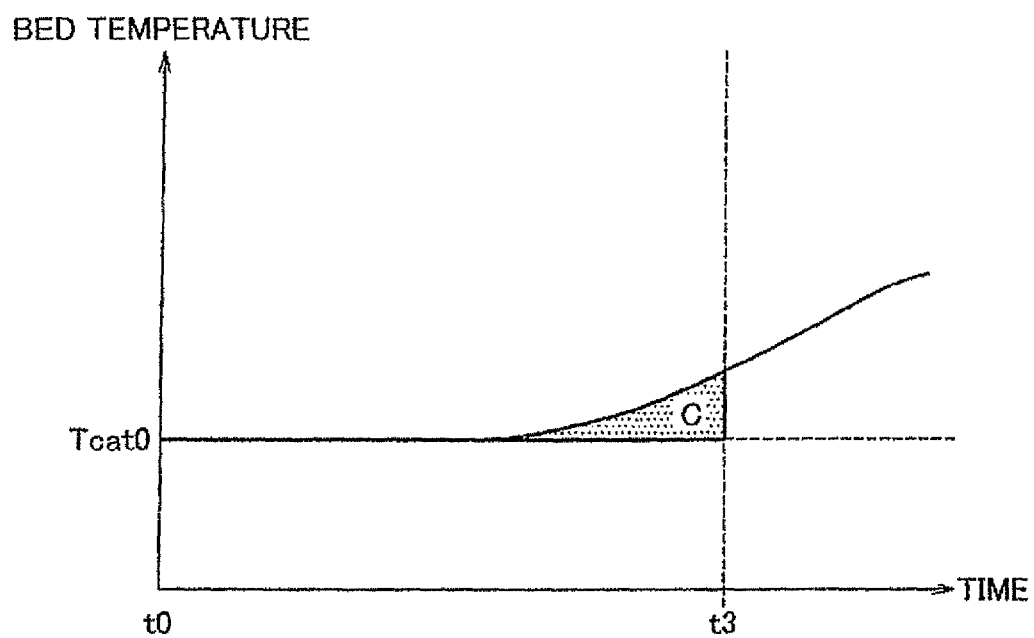
FIG. 13 is a diagram schematically showing the quantity of heat that is received by a basic catalyst from exhaust gas within a predetermined period from the start-up of an internal combustion engine.

In view of this, as shown in FIG. 13, the ECU 8 may be configured to obtain the quantity of heat (the area of a region C in FIG. 13) that is received by a catalyst with no moisture adsorption capacity (hereinafter, referred to as "basic catalyst") from exhaust gas within the above-mentioned predetermined time, and subtract the heat quantity from the integrated value ΣΔTcat. The basic catalyst is equivalent to the selective catalytic reduction catalyst 3 in function and structure, except for the ammonia adsorption capacity.

At this time, the quantity of heat that is received by the basic catalyst from exhaust gas within the above-mentioned predetermined time may be obtained experimentally in advance, or may be estimated from the operating state of the internal combustion engine 1.

According to this method, the quantity of heat of moisture adsorption reaction that is generated can be specified without being affected by the operating state of the internal combustion engine 1 within a predetermined period. As a result, the number of occasions on which degradation diagnosis can be performed increases.

Next, a third embodiment of the present invention will be described with reference to FIGS. 10 to 13. A description will be given here of configurations different from those of the first embodiment described above, and description of similar configurations is not repeated.

The third embodiment described above is directed to the example in which degradation and/or the degree of degradation of the selective catalytic reduction catalyst 3 is diagnosed on the basis of the quantity of heat of moisture adsorption reaction that is generated within a predetermined time from the start-up of the internal combustion engine 1.

In contrast, in this embodiment, a description will be given of an example in which degradation and/or the degree of degradation of the selective catalytic reduction catalyst 3 is diagnosed on the basis of the maximum value (highest value) Tcatmax of the bed temperature within a predetermined period from the start-up of the internal combustion engine 1.

As the degradation of the selective catalytic reduction catalyst 3 proceeds, the quantity of heat of moisture adsorption reaction that is generated decreases due to a decrease in maximum moisture quantity. Thus, the highest value that can be reached by the bed temperature (hereinafter, referred to as "highest bed temperature") Tcatmax within a predetermined period from the start-up of the internal combustion engine 1 becomes lower as the degradation of the selective catalytic reduction catalyst 3 proceeds.

If the end timing t3 of the above-mentioned predetermined period is set carelessly, cases may occur in which the highest bed temperature Tcatmax in the predetermined period does not correlate with the degree of degradation of the selective catalytic reduction catalyst 3. For this reason, the end timing t3 needs to be set in such a way that a clear difference occurs between the highest bed temperature in a normal condition and the highest bed temperature in a degraded condition. A suitable value that is obtained experimentally in advance may be used as the end timing that satisfies such a condition.

According to the degradation diagnosis method as described above, an effect similar to that of the third embodiment described above can be attained.

Figure 15:
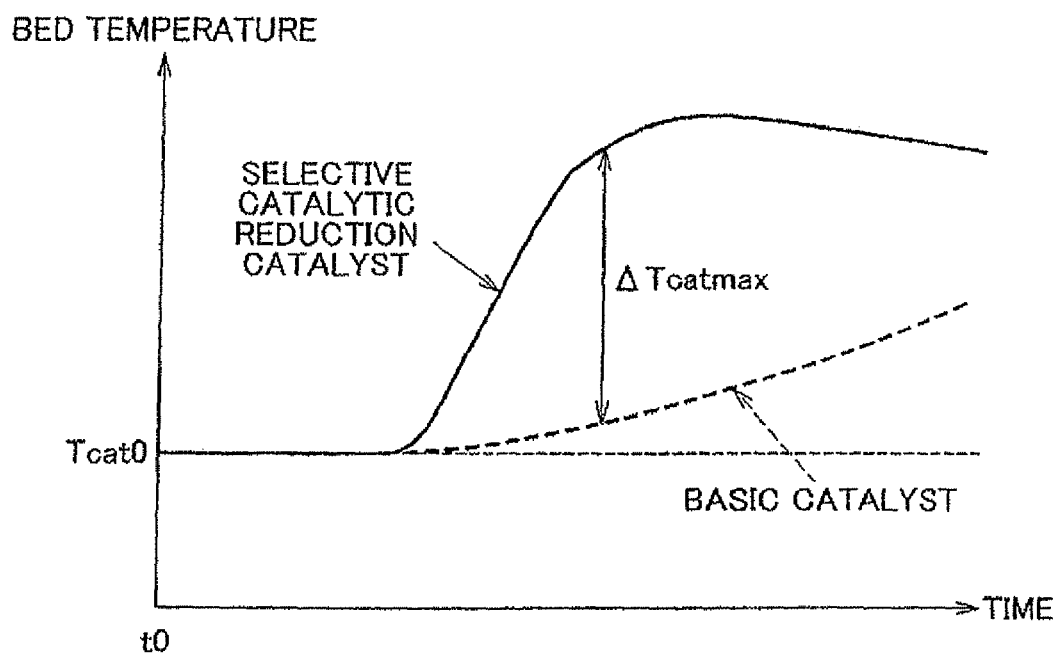
FIG. 15 is a diagram showing the maximum value of the difference between the bed temperature of a basic catalyst and the bed temperature of a selective catalytic reduction catalyst.

That the above-mentioned highest bed temperature varies also in accordance with the quantity of heat that is transmitted from exhaust gas to the selective catalytic reduction catalyst 3, in addition to the quantity of heat of moisture adsorption reaction that is generated. Thus, as shown in FIG. 15, the maximum value $\Delta$Tcatmax of the difference between the bed temperature of the basic catalyst and the bed temperature of the selective catalytic reduction catalyst 3 may be used instead of the highest bed temperature Tcatmax. In this case, a decrease in diagnostic accuracy attributable to how much quantity of heat is received by the selective catalytic reduction catalyst 3 from exhaust gas can be suppressed.

Next, a fifth embodiment of the present invention will be described with reference to FIGS. 16 to 18. A description will be given here of configurations different from those of the first to fourth embodiments described above, and description of similar configurations is not repeated.

While the first to fourth embodiments described above are directed to the method of diagnosing the degree of degradation of the selective catalytic reduction catalyst 3, this embodiment is directed to the case of diagnosing a malfunction of an urea addition device (the urea addition valve 4 or the tank 5).

Malfunction diagnosis for an urea addition device according to this embodiment is performed by using the degradation diagnosis result on the selective catalytic reduction catalyst 3. Thus, the ECU 8 performs malfunction diagnosis for an urea addition device after finishing execution of the degradation diagnosis according to any one of the first to fourth embodiments described above. Hereinbelow, a malfunction diagnosis method for an urea addition device will be described.

The ECU 8 feedback controls the addition quantity (target addition quantity) of urea solution so as to maximize the $NO_x$ purification rate, upon activation of the urea addition valve 4. The $NO_x$ purification rate represents a ratio of the quantity of $NO_x$ that is purified by the selective catalytic reduction catalyst 3 to the quantity of $NO_x$ that flows into the selective catalytic reduction catalyst 3.

The quantity $Ano_x$in of $NO_x$ that flows into the selective catalytic reduction catalyst 3 (hereinafter, referred to as "$NO_x$ inflow quantity") is obtained on the basis of the operating state of the internal combustion engine 1. The relationship between the operating state of the internal combustion engine 1 and the $NO_x$ inflow quantity $Ano_x$in may be obtained experimentally in advance.

The quantity of $NO_x$ that is purified in the selective catalytic reduction catalyst 3 is the difference (=$Ano_x$in−$Ano_x$out) between the quantity $Ano_x$out of $NO_x$ that flows out of the selective catalytic reduction catalyst 3 (hereinafter, referred to as "$NO_x$ outflow quantity"), and the $NO_x$ inflow quantity $Ano_x$in.

The $NO_x$ outflow quantity $Ano_x$out can be computed from the output signal value of the $NO_x$ sensor 7 ($NO_x$ concentration) and the output signal value of the airflow meter (intake air quantity).

The ECU 8 identifies the correlation between a $NO_x$ purification rate and an equivalence ratio, during execution of the above-mentioned feedback control. The equivalence ratio is a ratio of a target addition quantity to the $NO_x$ inflow quantity $Ano_x$in. The correlation that is specified by this method is approximated to a parabola shown in FIG. 16.

Figure 16:
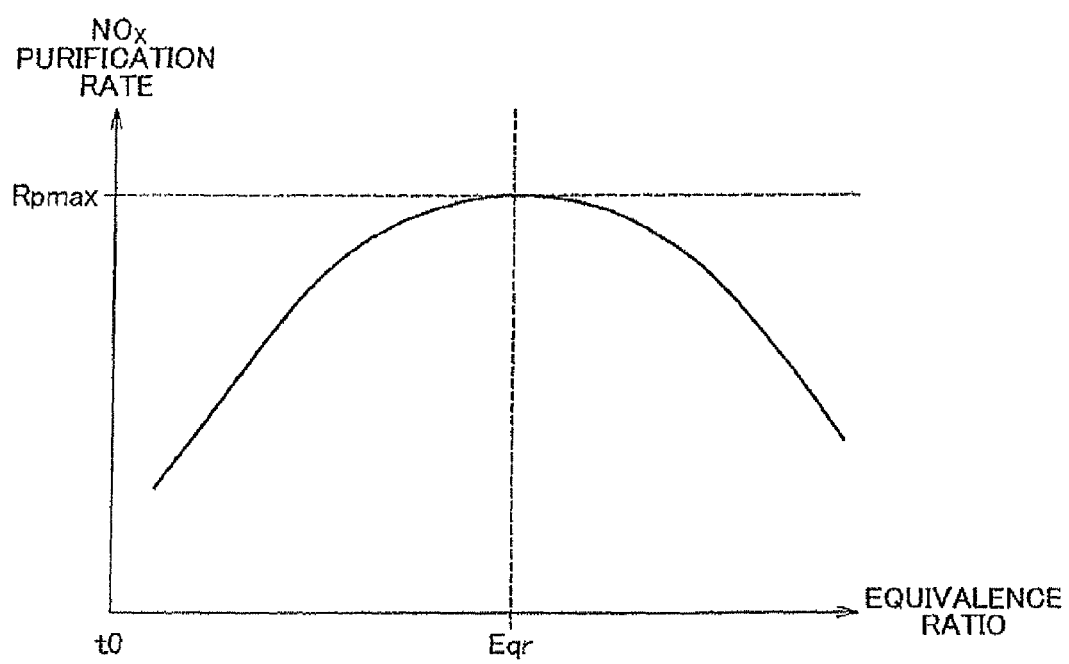
FIG. 16 is a diagram showing the correlation between the $NO_x$ purification rate and the equivalence ratio.
Figure 17:
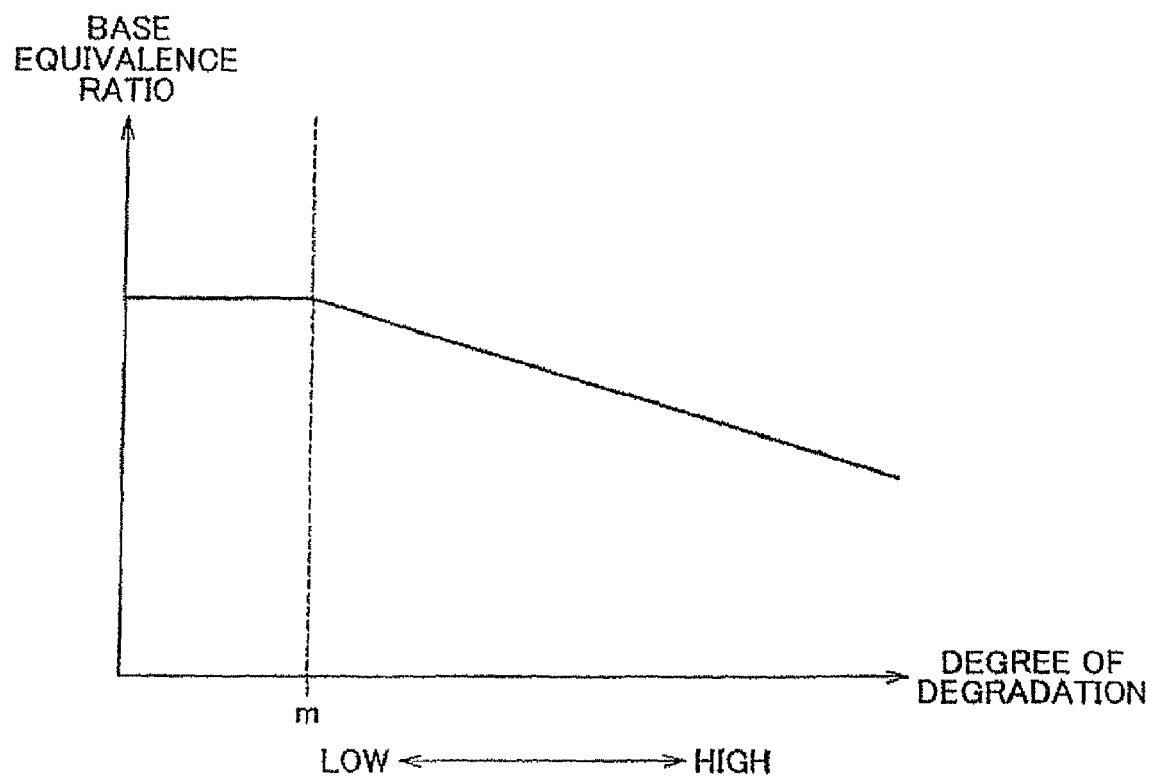
FIG. 17 is a diagram schematically showing a map that defines the relationship between the degree of degradation of a selective catalytic reduction catalyst and the base equivalence ratio.

Eqr in FIG. 16 indicates the equivalence ratio (actual equivalence ratio) at the time when the $NO_x$ purification rate exhibits the maximum value Rpmax. The reason why the $NO_x$ purification rate drops when the equivalence ratio becomes larger than the actual equivalence ratio Eqr is that the $NO_x$ sensor 7 also responds to ammonia similarly to $NO_x$.

Next, the ECU 8 acquires a base equivalence ratio Eqbase on the basis of the degradation diagnosis result on the selective catalytic reduction catalyst 3. The base equivalence ratio Eqbase represents an equivalence ratio at which the $NO_x$ purification rate becomes maximum when the actual quantity of addition by the urea addition valve 4 (actual addition quantity) is in agreement with a target addition quantity.

The relationship between the degree of degradation of the selective catalytic reduction catalyst 3 and the base equivalence ratio Eqbase may be obtained experimentally in advance. FIG. 17 is an example of a map showing the correlation between the degree of degradation of the selective catalytic reduction catalyst 3 and the base equivalence ratio Eqbase. In FIG. 17, in a region where the degree of degradation of the selective catalytic reduction catalyst 3 exceeds a permissible value "m", the base equivalence ratio Eqbase becomes smaller as the degree of degradation becomes higher. This is because the maximum ammonia quantity decreases as the degradation of the selective catalytic reduction catalyst 3 proceeds.

The base equivalence ratio Eqbase and the actual equivalence ratio Eqr that are obtained through the above-mentioned procedure have the following relationship.

That is, when the actual addition quantity is in agreement with the target addition quantity, the actual equivalence ratio Eqr and the base equivalence ratio Eqbase exhibit substantially equal values. On the other hand, when the actual addition quantity is not in agreement with the target addition quantity, the actual equivalence ratio Eqr exhibits a different value from the base equivalence ratio Eqbase.

Incidentally, there is a possibility that an error is contained in the output signal value of the $NO_x$ sensor 7. However, since the actual equivalence ratio Eqr is an equivalence ratio at the time when the $NO_x$ purification rate becomes relatively maximum, the actual equivalence ratio Eqr does not depend on the absolute value of $NO_x$ purification rate. Therefore, the above-mentioned relationship between the actual equivalence ratio Eqr and the base equivalence ratio Eqbase holds even when an error is contained in the output signal value of the $NO_x$ sensor.

Therefore, the ECU 8 can diagnose degradation/malfunction of the urea addition device by comparing the actual equivalence ratio Eqr and the base equivalence ratio Eqbase against each other.

For example, when the difference between the actual equivalence ratio Eqr and the base equivalence ratio Eqbase exceeds a permissible value, it can be determined that the urea addition device is malfunctioning.

When the actual equivalence ratio Eqr and the base equivalence ratio Eqbase differ from each other, and the difference between the two ratios is equal to or less than a permissible value, it may be determined that a decrease or increase in addition quantity due to clogging of the urea addition valve 4 or aging has occurred.

As described above, according to the malfunction diagnosis method according to this embodiment, it is possible to diagnose degradation or malfunction of the urea addition device with good accuracy. Further, if it is diagnosed that the difference between the actual equivalence ratio Eqr and the base equivalence ratio Eqbase is equal to or less than a permissible value, the ECU 8 can also correct the amount of control of the urea addition valve 4 so that the actual equivalence ratio Eqr is in agreement with the base equivalence ratio Eqbase. In the case, since the actual addition quantity can be approximated to a target addition quantity, it is possible to enhance the $NO_x$ purification rate and suppress ammonia slip.

If it is determined by the above-mentioned method that the addition value is not malfunctioning (if the difference between the actual equivalence ratio Eqr and the base equivalence ratio Eqbase is equal to or less than a permissible value), it is also possible to diagnose the detection error of the $NO_x$ sensor 7.

Hereinbelow, a method of specifying the detection error of the $NO_x$ sensor 7 will be described.

The value of $NO_x$ purification rate that is obtained during the feedback control mentioned above is dependent on the actual addition quantity and the detection value of the $NO_x$ sensor 7. However, under conditions in which the difference between the actual equivalence ratio Eqr and the base equivalence ratio Eqbase becomes equal to or less than a permissible value, the value of $NO_x$ purification rate mentioned above is dependent solely on the detection value of the $NO_x$ sensor 7. Thus, when the absolute value of $NO_x$ purification rate differs from a normal value, it can be considered that an error is contained in the output signal value of the $NO_x$ sensor 7.

Accordingly, when it is diagnosed that the urea addition device is not malfunctioning (or when the actual addition quantity is corrected so that the actual equivalence ratio Eqr is in agreement with the base equivalence ratio Eqbase), the ECU 8 acquires the maximum value Rpmax of $NO_x$ purification rate from the relative relationship shown in FIG. 16 described above, and compares the maximum value Rpmax against a normal value.

The above-mentioned normal value is the maximum value of $NO_x$ purification rate in the case when the actual addition quantity is in agreement with a target addition quantity (in other words, in the case when the actual equivalence ratio Eqr is in agreement with the base equivalence ratio Eqbase).

Figure 18:
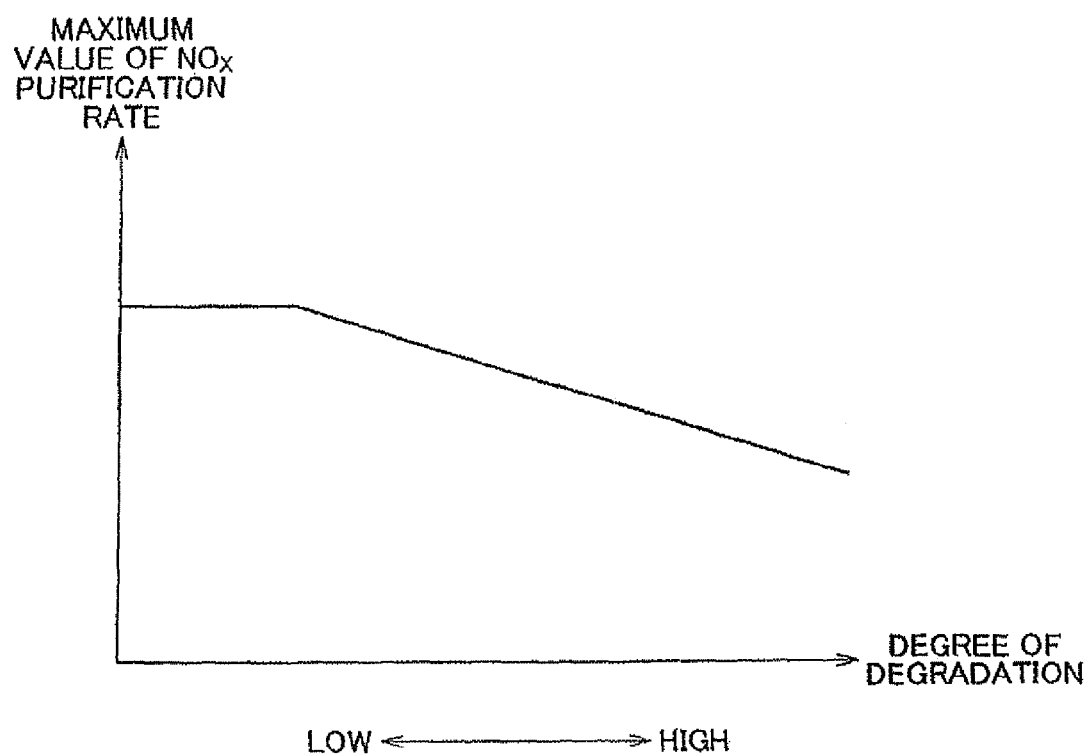
FIG. 18 is a diagram schematically showing a map that defines the relationship between the degree of degradation of a selective catalytic reduction catalyst and the maximum value of $NO_x$ purification rate.

Since the above-mentioned normal value varies in accordance with the degree of degradation of the selective catalytic reduction catalyst 3, the ECU 8 may be configured to set the normal value on the basis of the degree of degradation of the selective catalytic reduction catalyst 3 and a map shown in FIG. 18.

FIG. 18 is a map that defines the correlation between the degree of degradation of the selective catalytic reduction catalyst 3 and the normal value (the maximum value of $NO_x$ purification rate). Such a correlation is obtained experimentally in advance.

The ECU 8 can specify the detection error of the $NO_x$ sensor 7 by comparing a normal value that is obtained from the map in FIG. 18 against the maximum value Rpmax of $NO_x$ purification rate. That is, the ECU 8 can determine the detection error of the $NO_x$ sensor 7 to be greater as the difference between the above-mentioned maximum value Rpmax and the normal value becomes larger.

When the detection error of the $NO_x$ sensor 7 is specified by the method as described above, it is possible to obtain an accurate $NO_x$ concentration on the basis of this detection error and the output signal value of the $NO_x$ sensor 7. As a result, it is possible to achieve an improvement in $NO_x$ purification rate and a reduction in ammonia slip. It is also possible to determine that the $NO_x$ sensor 7 is malfunctioning if the difference between the maximum value Rpmax and the normal value mentioned above exceeds a permissible value.

The first to fifth embodiments described above may be combined as much as possible.

The exhaust gas purification catalyst such as a NOx storage reduction catalyst may be applied instead of the selective catalytic reduction catalyst and reductant such as HC may be applied instead of urea.

The invention claimed is:

1. A malfunction diagnosis device for an exhaust gas purification system, comprising:
    an exhaust gas purification catalyst disposed in an exhaust passage of an internal combustion engine;
    a reductant supply device that supplies reductant to exhaust gas that flows upstream of the exhaust gas purification catalyst;
    a detection portion that detects a physical quantity that correlates with a bed temperature of the exhaust gas purification catalyst; and
    a catalyst degradation diagnosis portion that diagnoses a degree of degradation of the exhaust gas purification catalyst based on the physical quantity that is detected by the detection portion over a period from when the internal combustion engine is started to when the reductant supply device is activated.

2. The malfunction diagnosis device for an exhaust gas purification system according to claim 1, wherein the catalyst degradation diagnosis portion diagnoses a degree of degradation of the exhaust gas purification catalyst by comparing an elapsed time from when the internal combustion engine is started to when an amount of change of the physical quantity per unit time exceeds a base value against a normal value.

3. The malfunction diagnosis device for an exhaust gas purification system according to claim 2, wherein the detection portion detects a physical quantity that correlates with a bed temperature near a rear end portion of the exhaust gas purification catalyst.

4. The malfunction diagnosis device for an exhaust gas purification system according to claim 2, wherein the catalyst degradation diagnosis portion corrects the normal value in accordance with the physical quantity when the internal combustion engine is started.

5. The malfunction diagnosis device for an exhaust gas purification system according to claim 2, wherein the catalyst degradation diagnosis portion corrects the normal value in accordance with a temperature of the exhaust passage when the internal combustion engine is started.

6. The malfunction diagnosis device for an exhaust gas purification system according to claim 1, wherein the catalyst degradation diagnosis portion diagnoses a degree of degradation of the exhaust gas purification catalyst by comparing an integrated intake air quantity from when the internal combustion engine is started to when an amount of change of the physical quantity per unit time exceeds a base value against a normal value.

7. The malfunction diagnosis device for an exhaust gas purification system according to claim 6, wherein the detection portion detects a physical quantity that correlates with a bed temperature near a rear end portion of the exhaust gas purification catalyst.

8. The malfunction diagnosis device for an exhaust gas purification system according to claim 6, wherein the catalyst degradation diagnosis portion corrects the normal value in accordance with the physical quantity when the internal combustion engine is started.

9. The malfunction diagnosis device for an exhaust gas purification system according to claim 6, wherein the catalyst degradation diagnosis portion corrects the normal value in accordance with a temperature of the exhaust passage when the internal combustion engine is started.

10. The malfunction diagnosis device for an exhaust gas purification system according to claim 1, wherein the catalyst degradation diagnosis portion diagnoses a degree of degradation of the exhaust gas purification catalyst by integrating a difference between the physical quantity and an initial value within a predetermined period from when the internal combustion engine is started, and comparing the integrated result against a normal value.

11. The malfunction diagnosis device for an exhaust gas purification system according to claim 10, wherein the catalyst degradation diagnosis portion corrects the normal value in accordance with the physical quantity when the internal combustion engine is started.

12. The malfunction diagnosis device for an exhaust gas purification system according to claim 10, wherein the catalyst degradation diagnosis portion corrects the normal value in accordance with a temperature of the exhaust passage when the internal combustion engine is started.

13. The malfunction diagnosis device for an exhaust gas purification system according to claim 1, wherein the catalyst degradation diagnosis portion diagnoses a degree of degradation of the exhaust gas purification catalyst by specifying a highest value of the physical quantity that is detected by the detection portion within a predetermined period from when the internal combustion engine is started, and comparing the specified highest value against a normal value.

14. The malfunction diagnosis device for an exhaust gas purification system according to claim 13, wherein the catalyst degradation diagnosis portion corrects the normal value in accordance with the physical quantity when the internal combustion engine is started.

15. The malfunction diagnosis device for an exhaust gas purification system according to claim 13, wherein the catalyst degradation diagnosis portion corrects the normal value in accordance with a temperature of the exhaust passage when the internal combustion engine is started.

16. The malfunction diagnosis device for an exhaust gas purification system according to claim 1, wherein the catalyst degradation diagnosis portion does not perform diagnosis if a temperature within the exhaust passage exceeds an evaporation start temperature of moisture within the exhaust passage when the internal combustion engine is started.

17. The malfunction diagnosis device for an exhaust gas purification system according to claim 1, wherein the catalyst degradation diagnosis portion does not perform diagnosis if the physical quantity exceeds a desorption start temperature of moisture that is adsorbed on the exhaust gas purification catalyst when the internal combustion engine is started.

18. The malfunction diagnosis device for an exhaust gas purification system according to claim 1, wherein the catalyst degradation diagnosis portion does not perform diagnosis if a temperature within the exhaust passage exceeds an evaporation start temperature when the internal combustion engine is started, and the physical quantity is higher than a desorption start temperature.

19. The malfunction diagnosis device for an exhaust gas purification system according to claim 1, wherein the catalyst degradation diagnosis portion does not perform diagnosis if a temperature within the exhaust passage is below a lower limit temperature when the internal combustion engine is started.

20. The malfunction diagnosis device for an exhaust gas purification system according to claim 1, further comprising:
a $NO_x$ sensor that detects a concentration of nitrogen oxides contained in exhaust gas flowing out of the exhaust gas purification catalyst;
an acquiring portion that acquires, when the reductant supply device is supplying a target amount of reductant, a correlation between an equivalence ratio, which is a ratio of the target reductant amount to a quantity of nitrogen oxides flowing into the exhaust gas purification catalyst and a $NO_x$ purification rate of the exhaust gas purification catalyst, based on an amount of $NO_x$ detected by the $NO_x$ sensor and the target reductant amount;
an equivalence ratio specifying portion that specifies an equivalence ratio at which the $NO_x$ purification rate is maximized in the correlation that is acquired by the acquiring portion;
a computing portion that computes an equivalence ratio at which the $NO_x$ purification rate of the exhaust gas purification catalyst is maximized, based on a result of diagnosis by the catalyst degradation diagnosis portion; and
a sub-diagnosis portion that diagnoses degradation or malfunction of the reductant supply device, by comparing the specified equivalence ratio by the equivalence ratio specifying portion and the equivalence ratio calculated by the computing portion.

21. The malfunction diagnosis device for an exhaust gas purification system according to claim 20, wherein if the sub-diagnosis portion diagnoses that the reductant supply device is neither degraded nor malfunctioning, the sub-diagnosis portion diagnoses degradation or malfunction of the $NO_x$ sensor by comparing a maximum value of the $NO_x$ purification rate against a normal value in the correlation that is acquired by the acquiring portion.

22. The malfunction diagnosis device for an exhaust gas purification system according to claim 1, wherein the exhaust gas purification catalyst is a selective catalytic reduction catalyst and the reductant is urea.

23. The malfunction diagnosis device for an exhaust gas purification system according to claim 1, wherein the reductant supply device does not supply the reductant during the period.

24. A malfunction diagnosis method for an exhaust gas purification system that includes an exhaust gas purification catalyst disposed in an exhaust passage of an internal combustion engine and a reductant supply device that supplies reductant to exhaust gas that flows upstream of the exhaust gas purification catalyst, the method comprising:
detecting a physical quantity that correlates with a bed temperature of the exhaust gas purification catalyst; and diagnosing a degree of degradation of the exhaust gas purification catalyst based on the detected physical quantity over a period from when the internal combustion engine is started to when the reductant supply device is activated.

25. The malfunction diagnosis method according to claim 24, wherein the reductant supply device does not supply the reductant during the period.

* * * * *